(12) United States Patent
Misra et al.

(10) Patent No.: US 10,040,628 B1
(45) Date of Patent: Aug. 7, 2018

(54) ITEM REPLACEMENT ASSISTANCE

(71) Applicant: Amazon Technologies, Inc., Reno, NV (US)

(72) Inventors: Avishkar Misra, Redmond, WA (US); Ohil Krishnamurthy Manyam, Bellevue, WA (US); Ramanathan Palaniappan, Issaquah, WA (US); Michel Leonard Goldstein, Seattle, WA (US); Raymond Lim, Bellevue, WA (US)

(73) Assignee: Amazon Technologies, Inc., Seattle, WA (US)

( * ) Notice: Subject to any disclaimer, the term of this patent is extended or adjusted under 35 U.S.C. 154(b) by 271 days.

(21) Appl. No.: 14/225,179

(22) Filed: Mar. 25, 2014

(51) Int. Cl.
  *B65G 1/02* (2006.01)
(52) U.S. Cl.
  CPC ..................................... *B65G 1/02* (2013.01)
(58) Field of Classification Search
  USPC ........................................................ 700/218
  See application file for complete search history.

(56) References Cited

U.S. PATENT DOCUMENTS

| | | | |
|---|---|---|---|
| 7,225,980 B2 | 6/2007 | Ku et al. | |
| 7,949,568 B2 | 5/2011 | Fano et al. | |
| 8,009,864 B2 | 8/2011 | Linaker et al. | |
| 8,175,925 B1* | 5/2012 | Rouaix | G06Q 20/203 705/22 |
| 8,189,855 B2 | 5/2012 | Opalach et al. | |
| 8,423,431 B1 | 4/2013 | Rouaix et al. | |
| 8,630,924 B2 | 1/2014 | Groenevelt et al. | |
| 8,688,598 B1 | 4/2014 | Shakes et al. | |
| 9,473,747 B2 | 10/2016 | Kobres et al. | |
| 2003/0002712 A1 | 1/2003 | Steenburgh et al. | |
| 2003/0222762 A1* | 12/2003 | Beigl | G06Q 10/087 235/385 |
| 2004/0181467 A1* | 9/2004 | Raiyani | G06Q 10/087 705/28 |
| 2008/0055087 A1 | 3/2008 | Horii et al. | |
| 2008/0077511 A1 | 3/2008 | Zimmerman | |
| 2008/0109114 A1 | 5/2008 | Orita et al. | |
| 2009/0121017 A1 | 5/2009 | Cato et al. | |
| 2009/0245573 A1 | 10/2009 | Saptharishi et al. | |
| 2011/0011936 A1 | 1/2011 | Morandi et al. | |
| 2012/0284132 A1 | 11/2012 | Kim et al. | |

(Continued)

OTHER PUBLICATIONS

Abhaya Asthana et al., "An Indoor Wireless System for Personalized Shopping Assistance", Proceedings of IEEE Workshop on Mobile Computing Systems and Applications, 1994, pp. 69-74, Publisher: IEEE Computer Society Press.

(Continued)

*Primary Examiner* — Kyle O Logan
(74) *Attorney, Agent, or Firm* — Athorus, PLLC

(57) ABSTRACT

Described is a system and method for assisting users in properly placing and/or positioning items at inventory locations within a materials handling facility. In one example, a placement location may be distinguished for the user through use of illumination or other techniques to assist the user in quickly identifying the proper location at which to place the item. Likewise, a proper position of the item may be presented to the user to assist the user in properly positioning the item at the placement location.

21 Claims, 18 Drawing Sheets

(56) References Cited

U.S. PATENT DOCUMENTS

| | | |
|---|---|---|
| 2013/0076898 A1 | 3/2013 | Philippe et al. |
| 2013/0253700 A1 | 9/2013 | Carson et al. |
| 2014/0084060 A1* | 3/2014 | Jain ................ G06Q 10/087 235/385 |
| 2014/0279294 A1* | 9/2014 | Field-Darragh ..... G06Q 10/087 705/28 |
| 2015/0019391 A1 | 1/2015 | Kumar et al. |
| 2015/0073907 A1 | 3/2015 | Purves et al. |

OTHER PUBLICATIONS

Cristian Pop, "Introduction to the BodyCom Technology", Microchip AN1391, May 2, 2011, pp. 1-26, vol. AN1391, No. DS01391A, Publisher: 2011 Microchip Technology Inc.

* cited by examiner

ITEM REPLACEMENT ASSISTANCE

BACKGROUND

Retailers, wholesalers, and other product distributors typically maintain an inventory of various items that may be ordered, purchased, leased, borrowed, rented, viewed, etc., by clients or customers. For example, an e-commerce website may maintain inventory in a fulfillment center. When a customer orders an item, the item is picked from inventory, routed to a packing station, packed and shipped to the customer. Likewise, physical stores maintain inventory in customer accessible areas (e.g., shopping area) and customers can locate items from within the store, pick the items from inventory and take them to a cashier for purchase, rental, etc.

Many of those physical stores also maintain inventory in an inventory area, or fulfillment center, that can be used to replenish inventory located in the shopping areas and/or to satisfy orders for items that are placed through other channels (e.g., e-commerce). Other examples of entities that maintain inventory include libraries, museums, rental centers, and the like. In each instance, during movement of items, they often get placed at the wrong location and/or improperly positioned such they are not easily identifiable.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

Figure 1:
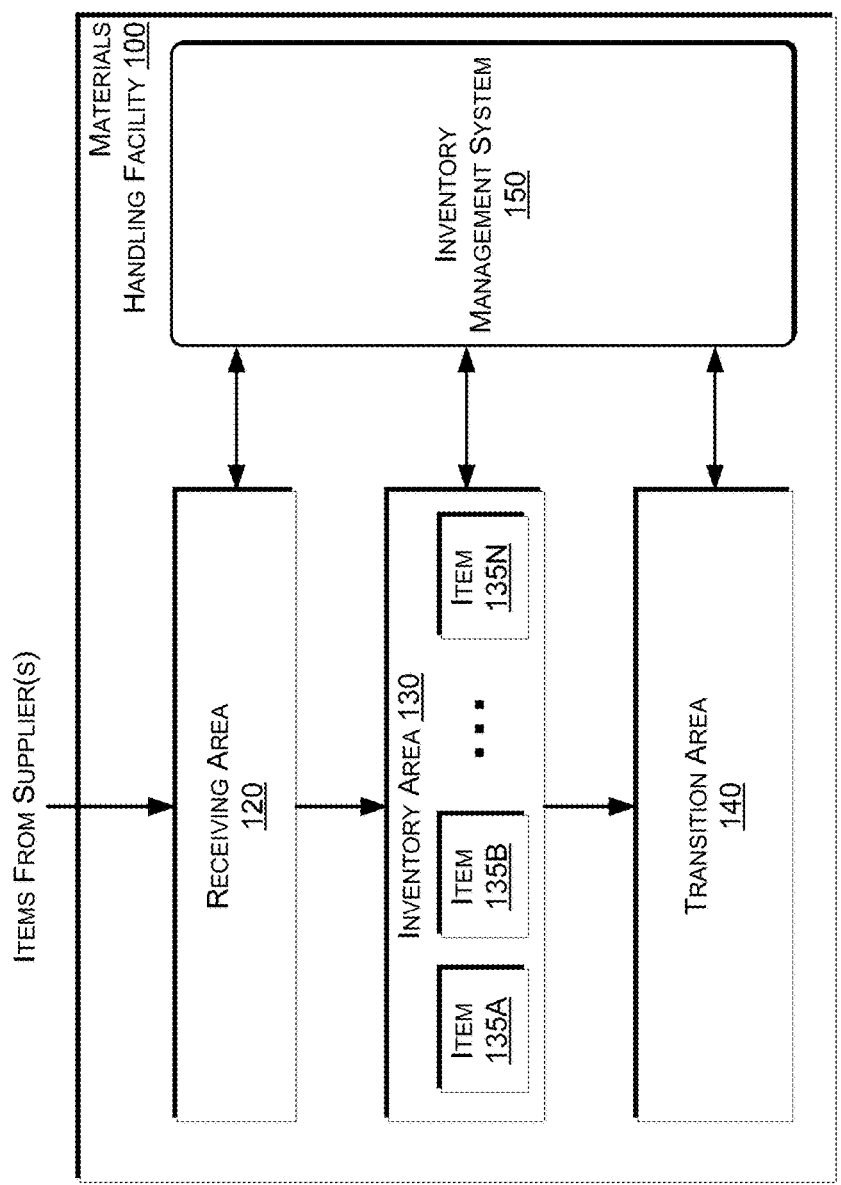
FIG. 1 is a block diagram illustrating a materials handling facility, according to one implementation.

While implementations are described herein by way of example, those skilled in the art will recognize that the implementations are not limited to the examples or drawings described. It should be understood that the drawings and detailed description thereto are not intended to limit implementations to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION

This disclosure describes a system and method for assisting users in properly placing items at inventory areas within a materials handling facility. In one example, where an item is to be placed may be distinguished for the user through use of illumination or other techniques to assist the user in quickly identifying the location. Likewise, a proper position of the item may be presented to the user to assist the user in properly positioning the item at the placement location. For example, if the item is to be positioned so that the label on the item is facing out toward the user, the user may be provided with a graphical representation of the item when placed at the proper position (e.g., the label facing out).

As the user places the item at the location, the placement is detected and a determination made as to whether the item has been properly positioned. If the item is properly positioned, a positive notification and/or award is provided to the user confirming the proper placement and positioning of the item. In some implementations, the user may be incented to relocate and/or reposition items within the materials handling facility that are not currently in their correct location and/or correct position. For example, for each item relocated and/or repositioned by the user, the user may receive an award. The award may be, for example, a credit (e.g., points, virtual currency), discount, a badge, a coupon, a rank, or other incentive. Awards presented to user may vary for different items and/or for different user. For example, the amount of the award may be based on, for example, the value of the item, the velocity or speed at which the item transitions through the materials handling facility, a distance traveled by the user to place the item at the location, a user profile, a quantity of the item in the materials handling facility, a shape of the item, a weight of the item, an item type, an item location, a time taken by the user to relocate the item, and/or based on how long the item has been at the wrong location. In some implementations, the amount of the award may vary depending on how many items within the materials handling facility are misplaced.

By tracking the location and position of items within the materials handling facility and assisting users in the proper placement and positioning of items, the inventory within the materials handling facility remains more organized and identifiable to other users. Encouraging users to perform proper placement and proper positioning of items reduces the time and cost required for another user to relocate and/or reposition the item.

As used herein, a materials handling facility may include, but is not limited to, warehouses, distribution centers, cross-docking facilities, order fulfillment facilities, packaging facilities, shipping facilities, rental facilities, libraries, retail stores, wholesale stores, museums, or other facilities or combinations of facilities for performing one or more functions of materials (inventory) handling.

An implementation of a materials handling facility configured to store and manage inventory items is illustrated in FIG. 1. As shown, a materials handling facility 100 includes a receiving area 120, an inventory area 130 configured to store an arbitrary number of inventory items 135A-135N, and one or more transition areas 140. The arrangement of the various areas within materials handling facility 100 is depicted functionally rather than schematically. For example, in some implementations, multiple different receiving areas 120, inventory areas 130 and transition areas 140 may be interspersed rather than segregated. Additionally, the materials handling facility 100 includes an inventory management system 150 configured to interact with each of receiving area 120, inventory area 130, transition area 140 and/or users within the materials handling facility 100.

The materials handling facility 100 may be configured to receive different kinds of inventory items 135 from various suppliers and to store them until a user orders or retrieves one or more of the items. The general flow of items through materials handling facility 100 is indicated using arrows. Specifically, as illustrated in this example, items 135 may be received from one or more suppliers, such as manufacturers, distributors, wholesalers, etc., at receiving area 120. In various implementations, items 135 may include merchandise, commodities, perishables, or any suitable type of item depending on the nature of the enterprise that operates the materials handling facility 100.

Upon being received from a supplier at receiving area 120, items 135 may be prepared for storage. For example, in some implementations, items 135 may be unpacked or otherwise rearranged, and the inventory management system 150 (which, as described below, may include one or more software applications executing on a computer system) may be updated to reflect the type, quantity, condition, cost, location or any other suitable parameters with respect to newly received items 135. It is noted that items 135 may be stocked, managed or dispensed in terms of countable, individual units or multiples of units, such as packages, cartons, crates, pallets or other suitable aggregations. Alternatively, some items 135 such as bulk products, commodities, etc., may be stored in continuous or arbitrarily divisible amounts that may not be inherently organized into countable units. Such items 135 may be managed in terms of measurable quantities such as units of length, area, volume, weight, time duration or other dimensional properties characterized by units of measurement. Generally speaking, a quantity of an item 135 may refer to either a countable number of individual or aggregate units of an item 135 or a measurable amount of an item 135, as appropriate.

After arriving through receiving area 120, items 135 may be stored within inventory area 130. In some implementations, like items 135 may be stored or displayed together in bins, on shelves or via other suitable storage mechanisms, such that all items 135 of a given kind are stored in one location. In other implementations, like items 135 may be stored in different locations. For example, to optimize retrieval of certain items 135 having high turnover or velocity within a large physical facility, those items 135 may be stored in several different locations to reduce congestion that might occur at a single point of storage.

When a user order specifying one or more items 135 is received, or as a user progresses through the materials handling facility 100, the corresponding items 135 may be selected or "picked" from inventory area 130. For example, in one implementation, a user may have a list of items to pick and may progress through the materials handling facility picking items 135 from the inventory area 130. In other implementations, materials handling facility employees (referred to herein as users) may pick items 135 using written or electronic pick lists derived from orders. In some instances, an item may need to be repositioned from one location within the inventory area 130 to another location. For example, in some instances an item may be picked from its inventory area, moved a distance and placed at another location. It may be determined that the item should be returned to its prior location. As discussed below, the implementations described herein provide a system and method for instructing a user to retrieve the item and relocate it to the inventory area. In addition, position information may be presented to the user to assist the user in properly positioning the item when it is placed.

Figure 2:
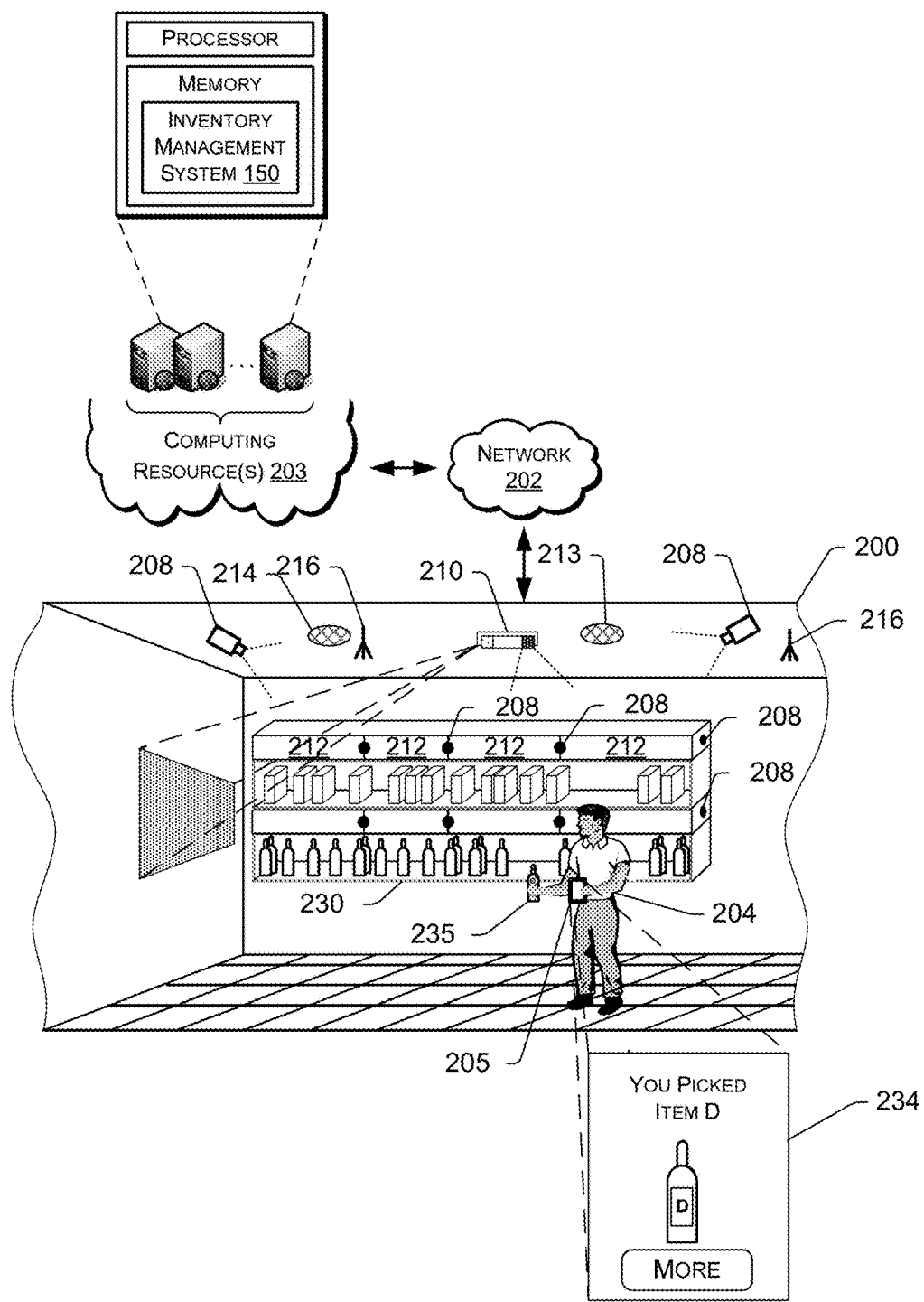
FIG. 2 is a block diagram illustrating additional details of a materials handling facility, according to one implementation.

FIG. 2 shows additional components of a materials handling facility 200, according to one implementation. Generally, the materials handling facility 200 may include one or more image capture devices, such as cameras 208. For example, one or more cameras 208 may be positioned in locations of the materials handling facility 200 so that images of locations and/or users within the materials handling facility can be captured. In some implementations, the image capture devices 208 may be positioned overhead, such as on the ceiling to capture images of users and/or locations within the materials handling facility. In addition, in some implementations, one or more cameras 208 may be positioned on or inside of inventory areas. For example, a series of cameras 208 may be positioned on external portions of the inventory areas and positioned to capture images of users and/or the location surrounding the inventory area. Likewise, one or more cameras 208 may be positioned within the inventory areas to capture images of items stored in the inventory areas.

Any type of camera and/or configuration of cameras may be used with the implementations described herein. For example, one or more of the cameras may be RGB cameras, still cameras, motion capture/video cameras, etc. In other implementations, one or more of the cameras may be depth sensing cameras.

In addition to cameras, other input devices, such as pressure sensors, infrared sensors, scales, light curtains, load cells, etc., may be utilized with the implementations described herein. For example, a pressure sensor and/or a scale may be used to detect when an item is added and/or removed from inventory areas.

When the user 204 arrives at the materials handling facility 200, one or more images of the user 204 may be captured and processed. For example, the images of the user 204 may be processed to identify the user 204. This may be done using a variety of techniques such as facial recognition, pattern matching, etc. In some implementations, rather than or in addition to processing images to identify the user, other techniques may be utilized to identify the user. For example, the user may provide an identification (e.g., user name, password), the user may present an identifier (e.g., identification badge, card), an active tag (e.g., RFID tag) in the possession of the user may be detected, a visual tag in the possession of the user may be detected, biometrics may be utilized to identify the user, etc.

The captured images and/or other inputs may also be used to establish a user pattern for the user 204 while located in the materials handling facility 200. The user pattern may identify an overall shape of the user 204, any distinguishing features of the user 204 (e.g., color of shirt, height) that may be used to assist in the identification and/or tracking of the user 204 as they progress through the materials handling facility 200.

In some implementations, a user 204 located in the materials handling facility 200 may possess a portable device 205 and obtain information about items located within the materials handling facility 200. Generally, the portable device 205 has at least a wireless module to facilitate communication with the inventory management system 150 and a display (e.g., a touch based display) to facilitate visible presentation to and interaction with the user 204. The portable device 205 may store a unique identifier and provide that unique identifier to the inventory management system 150 and be used to identify the user 204. In some instances, the portable device 205 may also have other features, such as audio input/output (e.g., speaker(s), microphone(s)), video input/output (camera(s), projector(s)), haptics (e.g., keyboard, keypad, touch screen, joystick, control buttons) and/or other components.

In some instances, the portable device 205 may operate in conjunction with or may otherwise utilize or communicate with one or more components of the inventory management system 150. Likewise, components of the inventory management system 150 may interact and communicate with the portable device 205 as well as identify the user 204, communicate with the user 204 via other means and/or communicate with other components of the inventory management system 150.

Generally, the inventory management system 150 may include one or more input/output devices, such as imaging devices (e.g., cameras) 208, projectors 210, displays 212, speakers 213, microphones 214, illumination elements (e.g., lights), etc., to facilitate communication between the inventory management system 150 and/or the user 204. In some implementations, multiple input/output devices may be distributed within the materials handling facility 200. For example, there may be multiple imaging devices, such as cameras located on the ceilings and/or cameras (such as pico-cameras) located in the aisles near the inventory items.

Likewise, the inventory management system 150 may also include one or more communication devices, such as wireless antennas 216, that facilitate wireless communication (e.g., Wi-Fi, Near Field Communication (NFC), Bluetooth) between the inventory management system 150 and the portable device 205. The inventory management system 150 may also include one or more computing resource(s) 203, such as a server system, that may be local to the environment (e.g., materials handling facility), remote from the environment, or any combination thereof.

The inventory management system 150 may utilize antennas 216 within the materials handling facility 200 to create a network 202 (e.g., Wi-Fi) so that the portable device 205 can connect to and communicate with the inventory management system 150. Likewise, in instances when one or more of the components of the inventory management system 150 are remote from the materials handling facility 200, they may communicate with other components of the inventory management system 150 and/or the portable device 205 via the network 202. For example, when the user 205 picks an item 235 from an inventory area 230, the inventory management system 150 may receive information, such as a load cell change and/or an image, identifying that an item has been removed from the inventory area 230. The item may then be identified and the inventory management system 150 may send item information to the portable device 205 for presentation to the user 204. In this example, the user 204 has picked "Item D" from the inventory area 230. The item was identified and item information provided over the network 202 from the inventory management system 150 to the portable device 205 and presented to the user 204. In this example, the item information is used to graphically present a representation 234 of the picked item to the user via the display on the portable device 205. In other implementations, the item information may be provided to other output devices, such as displays 212, projector 210, speakers 213, etc., and presented to the user 204.

Figure 3:
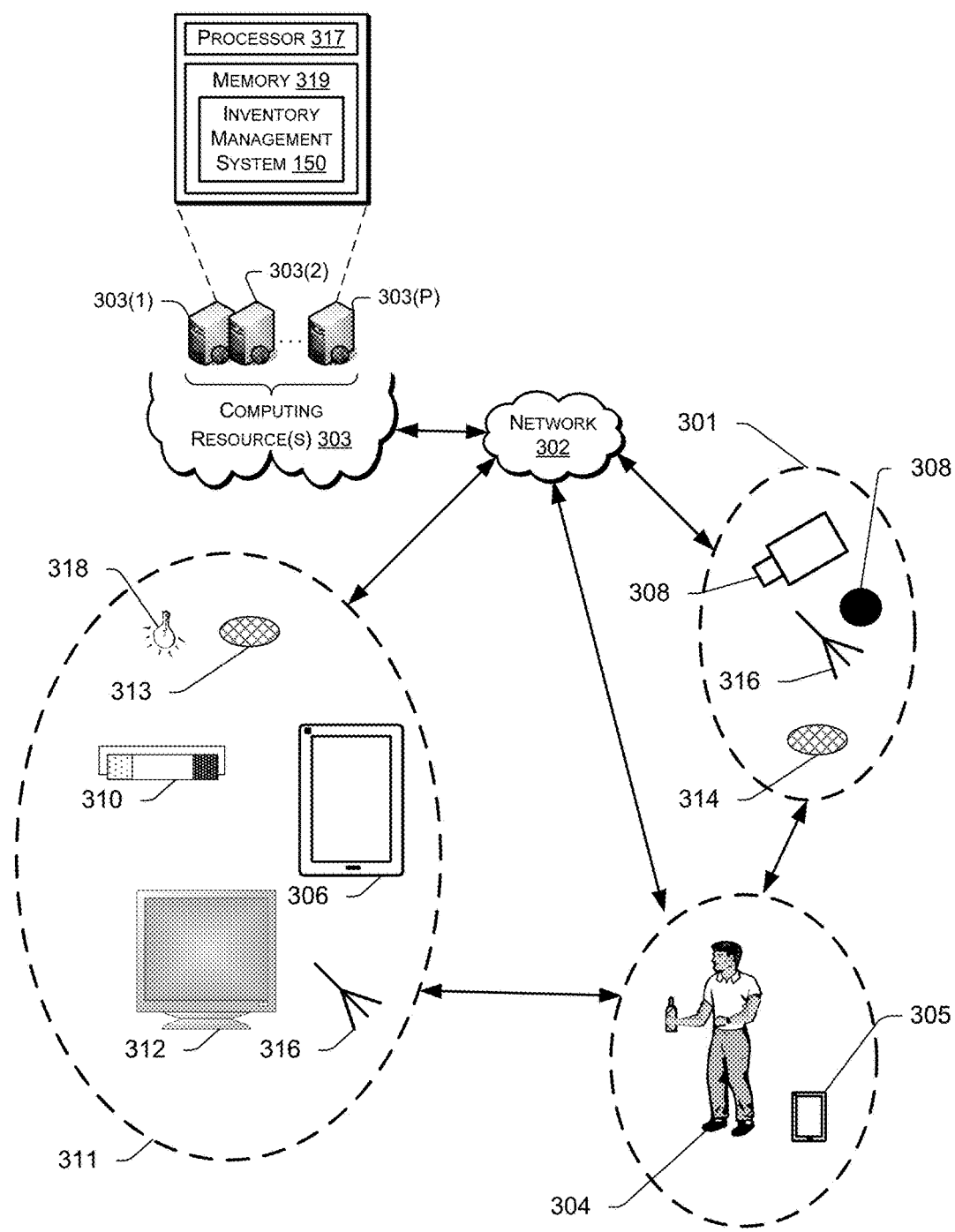
FIG. 3 shows additional components and communication paths between component types utilized in a materials handling facility of FIG. 1, according to one implementation.
Figure 4:
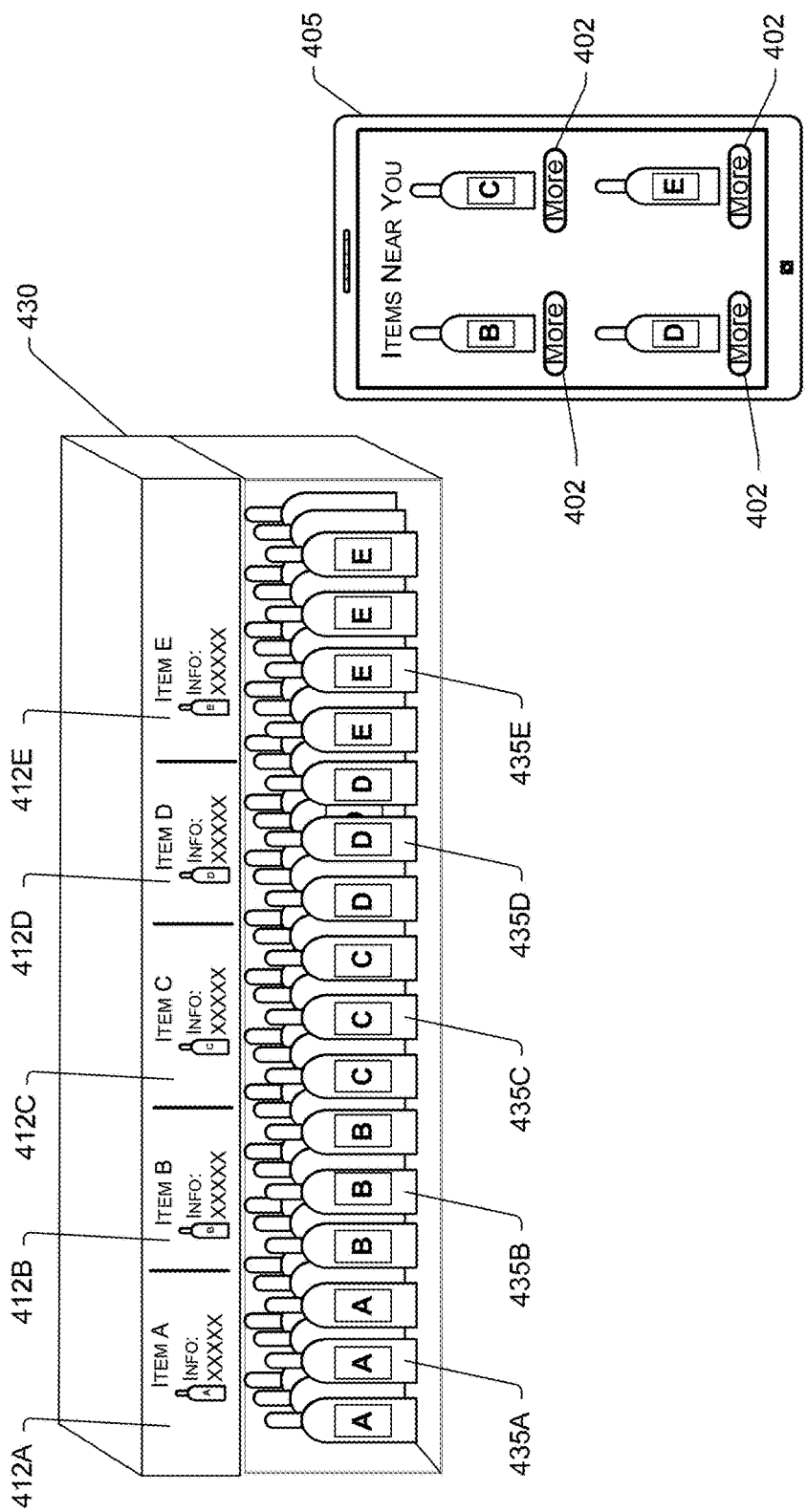
FIGS. 4-7 are block diagrams of an inventory area and a portable device for presenting item information, according to one implementation.

FIG. 3 shows additional components and communication paths between component types utilized in a materials handling facility 100, in accordance with one implementation. As discussed above, the portable device 305 may communicate and interact with various components of an inventory management system 150 over a variety of communication paths. Generally, the inventory management system 150 may include input components 301, output components 311 and computing resource(s) 303. The input components 301 may include an imaging device 308, microphone 314, antenna 316, or any other component that is capable of receiving input about the surrounding environment and/or from the user. The output components 311 may include a projector 310, a portable device 306, a display 312, an antenna 316, a radio (not shown), speakers 313, illumination elements 318 (e.g., lights), and/or any other component that is capable of providing output to the surrounding environment and/or the user.

The inventory management system 150 may also include computing resource(s) 303. The computing resource(s) 303 may be local to the environment (e.g., materials handling facility), remote from the environment, or any combination thereof. Likewise, the computing resource(s) 303 may be configured to communicate over a network 302 with input components 301, output components 311 and/or directly with the portable device 305 and/or the user 304.

As illustrated, the computing resource(s) 303 may be remote from the environment and implemented as one or more servers 303(1), 303(2), . . . , 303(P) and may, in some instances, form a portion of a network-accessible computing platform implemented as a computing infrastructure of processors, storage, software, data access, and so forth that is maintained and accessible by components/devices of the inventory management system 150 and/or the portable device 305 via a network 302, such as an intranet (e.g., local area network), the Internet, etc. The computing resources 303 may process images of users 304 to identify the user 304, process images of items to identify items, determine a location of items and/or determine a position of items. The computing resource(s) 303 do not require end-user knowledge of the physical location and configuration of the system that delivers the services. Common expressions associated for these remote computing resource(s) 303 include "on-demand computing," "software as a service (SaaS)," "platform computing," "network-accessible platform," "cloud services," "data centers," and so forth.

Each of the servers 303(1)-(P) include a processor 317 and memory 319, which may store or otherwise have access to an inventory management system 150, which may include or provide image processing (e.g., for user identification, expression identification, and/or item identification), inventory tracking, and/or location determination.

The network 302 may utilize wired technologies (e.g., wires, USB, fiber optic cable, etc.), wireless technologies (e.g., RF, IR, NFC, cellular, satellite, Bluetooth, etc.), or other connection technologies. The network 302 is representative of any type of communication network, including data and/or voice network, and may be implemented using wired infrastructure (e.g., cable, CAT5, fiber optic cable, etc.), a wireless infrastructure (e.g., RF, cellular, microwave, satellite, Bluetooth, etc.), and/or other connection technologies.

FIGS. 4-7 are block diagrams of an inventory area 430 and a portable device 405 for providing assistance to a user in placing and/or positioning an item, in accordance with one implementation. As discussed above, the inventory area 430 may include one or more output devices, such as displays 412, image capture devices (not shown), illumination elements (e.g., lights), etc. In this example, lights are positioned on the upper inside of the inventory area such that they illuminate the inventory 435.

In an initial state, the displays 412 may present information about inventory items 435 located adjacent to the display. For example, display 412A may present information related to Item A 435A, such as the item name, a representation of the item, item price, item size, item weight, etc. Likewise, the portable device 405 may present item information to the user related to items located within the inventory area 430 as the user approaches the inventory area 430. For example, as the user approaches inventory area 430, the inventory management system may identify the position of the user within the materials handling facility and send to the portable device 405 item information related to the items 435 located at the inventory area 430. A variety of techniques may be used to determine the location of the user within the materials handling facility. For example, indoor positioning information may be used to determine the user's location, image processing of images obtained by one or more of the image capture devices may be used to determine the location of the user, etc.

The item information provided to the portable device 405 may be presented to the user via a display of the portable device 405 and the user may interact with the portable device 405 to obtain additional information about the item (s). In this example, the portable device presents a graphical representation of each item 435A-435E of inventory located at the nearby inventory area 430. The user may obtain more information about one of the items of inventory by selecting the "More" control 402 presented adjacent to each item representation. Likewise, in some implementations, the user may interact with one of the displays 412 to obtain more information about an item.

Figure 5:
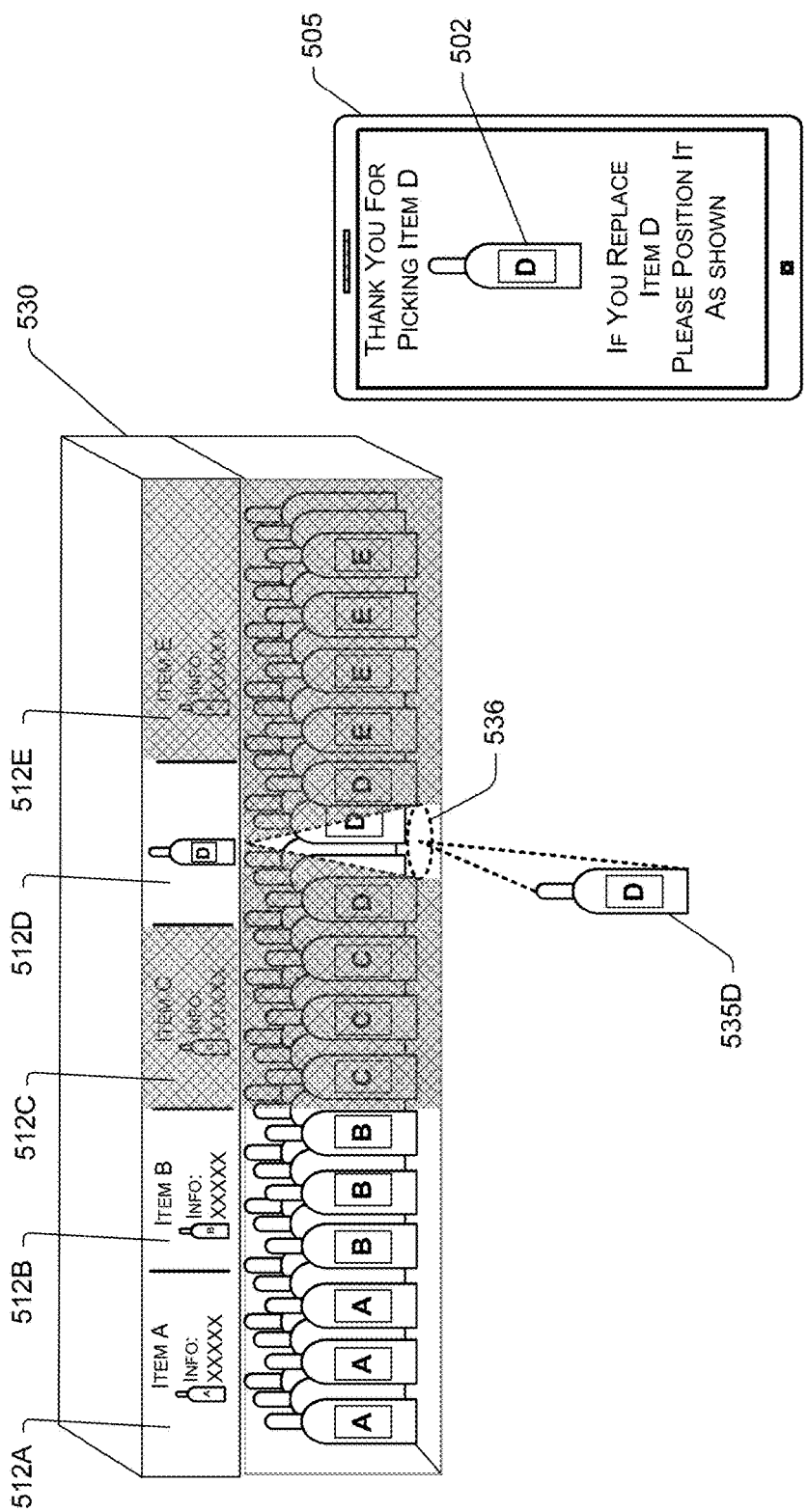

Turning now to FIG. 5, if a user picks an item such as item 535D from the inventory area 530, the pick may be determined by the inventory management system. For example, one or more of the input devices (e.g., camera, load cell, scale) may detect the item removal and provide information to the inventory management system 150 that an item has been picked. The inventory management system 150 may utilize that information to identify the picked item.

In the example illustrated in FIG. 5, a load cell located on the shelf of the inventory area 530 detects a decrease in inventory weight when the item 535D is picked and provides item pick information regarding the picked item to the inventory management system 150. The item pick information may include information identifying the location within the inventory area 530 from which the item was picked, the shape of the picked item, the detected change in weight, and/or other information. The inventory management system 150, upon receiving the item pick information, may search an item data store to determine the item located at the location identified in the received item pick information.

Upon determining the picked item, the inventory management system 150 may provide item information relating to the picked item to the portable device 505 and/or the display 512D adjacent to the inventory area from which the item was picked. For example, the item information provided to the portable device 505 may include an identification of the item picked by the user and a representation 502 of the item when properly positioned at the inventory area 530. In this example, "Item D" 535D has been picked from the inventory area 530 and the item information provided to the portable device 505 and presented to the user includes an acknowledgement that the user picked Item D 535D— "Thank You For Picking Item D"—a graphical representation of Item D when properly positioned, and instructions asking that if the user places the item to please position it at the inventory area 530 as shown by the representation. In this example, proper placement of the item is such that the main label of the item is positioned forward and visible to users. For some items, there may be only one proper position for the item (e.g., the main label facing forward). For other items, there may be multiple proper positions for the item (e.g., the main label facing forward, the rear label facing forward).

In addition to presenting information on the portable device 505, item information may be presented on one or more of the output devices 512. For example, the inventory management system 150 may provide item information to the output device 512E that is presented to the user. For example, rather than presenting the item information discussed above with respect to FIG. 4, the display 512D may distinguish the location 536 by presenting a larger representation of the item when properly positioned at the location 536. This information helps distinguish the location 536 (referred to herein as a placement location) at which the item is to be placed if the user places the item. This information also provides assistance to the user as to how the item is to be properly positioned when placed at the placement location 536.

In some implementations, rather than providing item information to the output device 512, the inventory management system may provide an instruction to alter the displayed information. The output device 512 may already include the representation stored in a memory of the output device and, in response to receiving the instruction from the inventory management system 150, may utilize the stored representation to alter the display. In still another implementation, when it is determined that an item is picked, the determination may be used to automatically alter the display 512.

In addition to altering the presentation of information on the display 512D, other activities may be performed to further distinguish the placement location. For example, the brightness of the display 512D may be increased to further distinguish the placement location. Alternatively, or in addition thereto, as illustrated in FIG. 5, the brightness of one or more of the adjacent displays 512C, 512E may be decreased to further distinguish the placement location. In some implementations, the placement location itself may be distinguished. For example, one of the illumination elements included in the inventory area that is near the placement location 536 may have the brightness increased to distinguish the placement location 536. In addition, or as an alternative thereto, as illustrated in FIG. 5, the brightness of other illumination elements near the placement location 536 may be reduced to further distinguish the placement location 536 to the user. In some implementations, the location may further be distinguished by projecting or otherwise superimposing a representation of the item at the location. For example, a graphical representation of the item may be projected from a projector 310 such that the projected image of the item appears at the location where the item is to be placed. In some implementations, audible output may also be emitted or otherwise projected from an output located near the location to assist the user in identifying the location.

Figure 6:
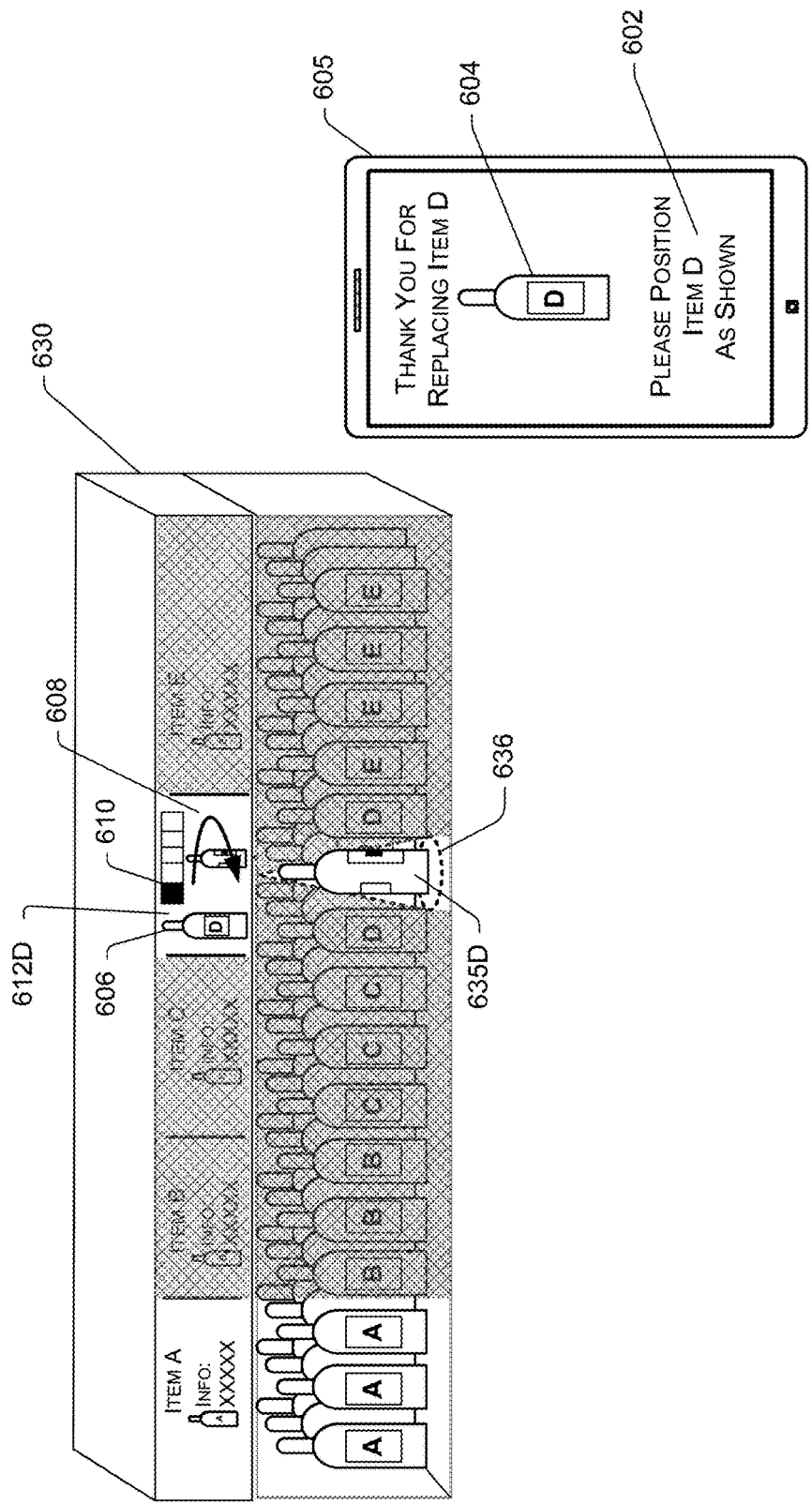

FIG. 6 illustrates the placement of an item 635D at a placement location 636, according to one implementation. An item may be placed at the placement location 636 after being picked from the location 636 by the user or may be placed at the placement location as part of another operation (e.g., relocating items, stocking items). For example, as illustrated in FIG. 5, a user may pick an item from the inventory area 630, look at the item and then return the item to the placement location. Alternatively, as discussed below, some users may improperly place items. For example, a user may pick an item that was placed at a location within the materials handling facility where it did not belong and then place the item at the placement location. As another example, a user, agent or employee of the materials handling facility may be adding inventory to the inventory area and may be placing an item at the placement location.

When an item is placed at the placement location 636, a determination is made as to whether the item is properly positioned at the placement location 636. For example, one or more images of the item may be captured or received and compared with stored images of the item representing the item at the proper position and/or at improper positions when placed at the inventory location. Alternatively, if the item has a unique shape, the shape of the item when placed at the placement location may be determined (e.g., by pressure points on a load cell) and compared to a stored orientation of the shape of the item when properly placed at the placement location 636. In some implementations, the proper position of the item may be within a range or degree of proper positions. For example, an item may be considered properly positioned if it is within ±5 degrees of the proper position of the item.

If it is determined that the item has not been properly positioned, repositioning information may be provided by the inventory management system 150 to the portable device 605 and the portable device may present instructions 602 requesting that the user reposition the item. The instructions may include a graphical representation 604 of the item when properly positioned at the placement location, a request to reposition the item, an animation showing how to reposition the item, etc. Likewise, reposition instructions may be provided to the output device 612D that are presented to the user asking the user to reposition the item. Similar to the reposition instructions provided on the portable device 605, the reposition instructions provided on the display 612D may include a graphical representation 606 of the item when properly positioned at the placement location 636, a request to reposition the item, an animation 608 or other visual representation (e.g., video) showing how to reposition the item, a progress indicator 610 illustrating how close the user is towards properly positioning the item, etc. As the user repositions the item, the progress indicator 610 may increase as the user gets closer to the proper positioning of the item or may decrease if the user is moving the item further out of position.

Figure 7:
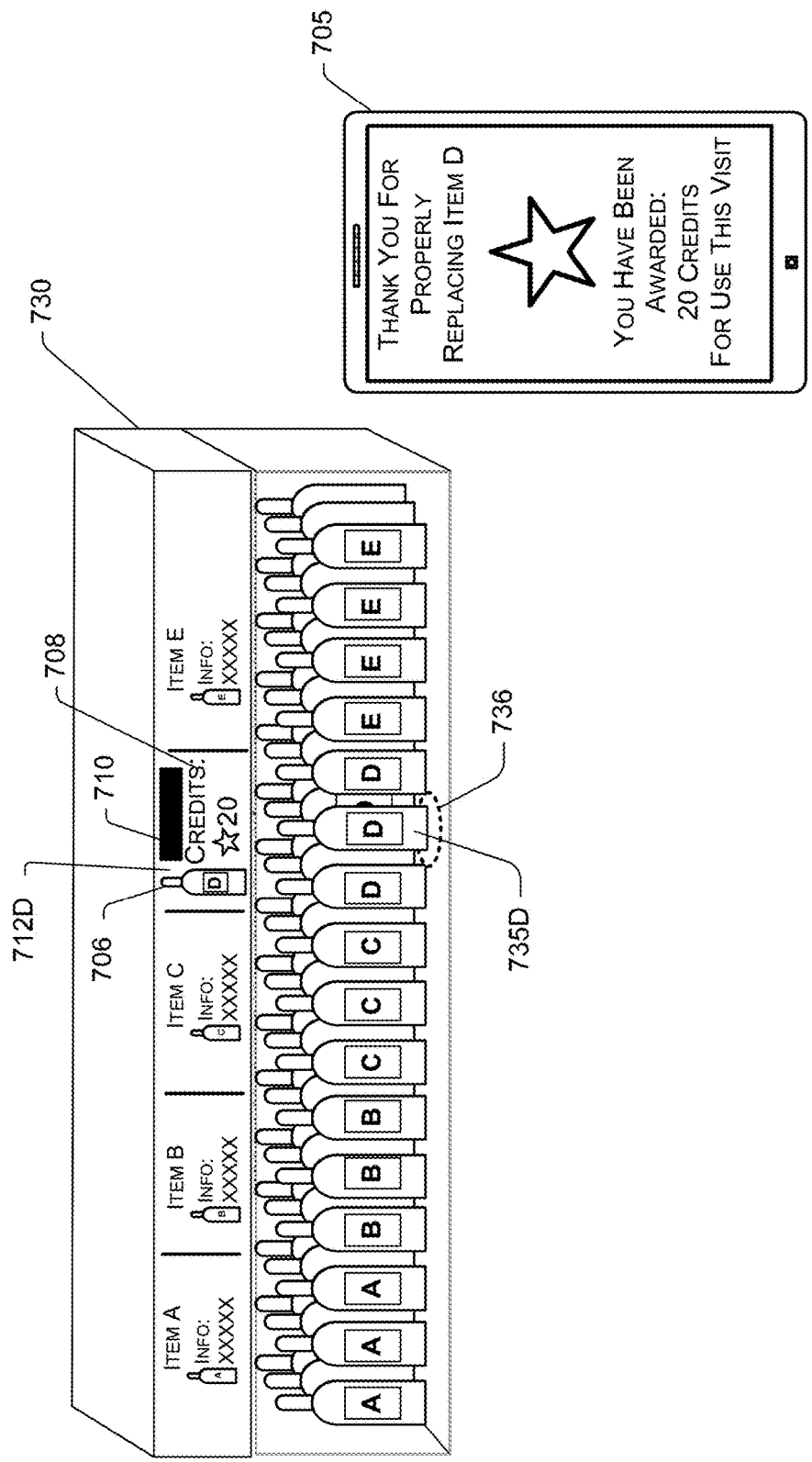

For example, the progress indicator 710 of FIG. 7 illustrates that the user has properly repositioned the item 735D. When an item has been properly positioned at the placement location 736, the inventory management system 150 may provide acknowledgement instructions via a graphical representation 706 to the display 712D that are presented to the user to acknowledge that the item 735D has been properly positioned at the placement location 736. In some implementations, the user may receive an award 708 or other incentive for placing the item at the proper location (placement location) and/or for properly positioning the item that may be presented on the display 712D.

The award or incentive may be, for example, a credit, a discount, a free item, a badge, a coupon, or a rank. In some implementations, the award may be limited to use only within the materials handling facility and/or only for use during that visit to the materials handling facility by the user. For example, the user may receive a discount (e.g., 5%) that may be applied to a purchase, rental or other consumption of items in the materials handling facility during that user's visit at the materials handling facility. In other implementations, the award may be usable and/or presented at other locations. For example, if the owner of the materials handling facility is an e-commerce retailer, the award may be associated with the user's account and may be applied to purchases made on the website of the e-commerce retailer. In still other implementations, awards or incentives may only be periodically generated and associated with the users account. For example, a user may only receive awards for certain placement or positioning actions. For example, a user may not receive an award for properly placing and/or properly positioning an item picked by the user themselves, but they may receive an award or incentive for placing and/or properly positioning an item that was picked and improperly placed and/or positioned by another user.

In addition to presenting acknowledgement information to the user via the display 712D, when the user has properly positioned the item 735D at the placement location 736, acknowledgement information may be provided by the inventory management system 150 to the portable device 705 and presented to the user, as illustrated in FIG. 7.

In addition to presenting acknowledgement information to the user via the display 712D, portable device 705 and/or via another output device within the materials handling facility, the activities to distinguish the placement location 736 may be removed. For example, the illumination elements within the inventory area 730 may be returned to their normal levels of brightness, as illustrated in FIG. 7. Likewise, the illumination and/or information displayed on the display 712D may be returned to its normal state after the acknowledgement information is presented to the user.

Figure 8:
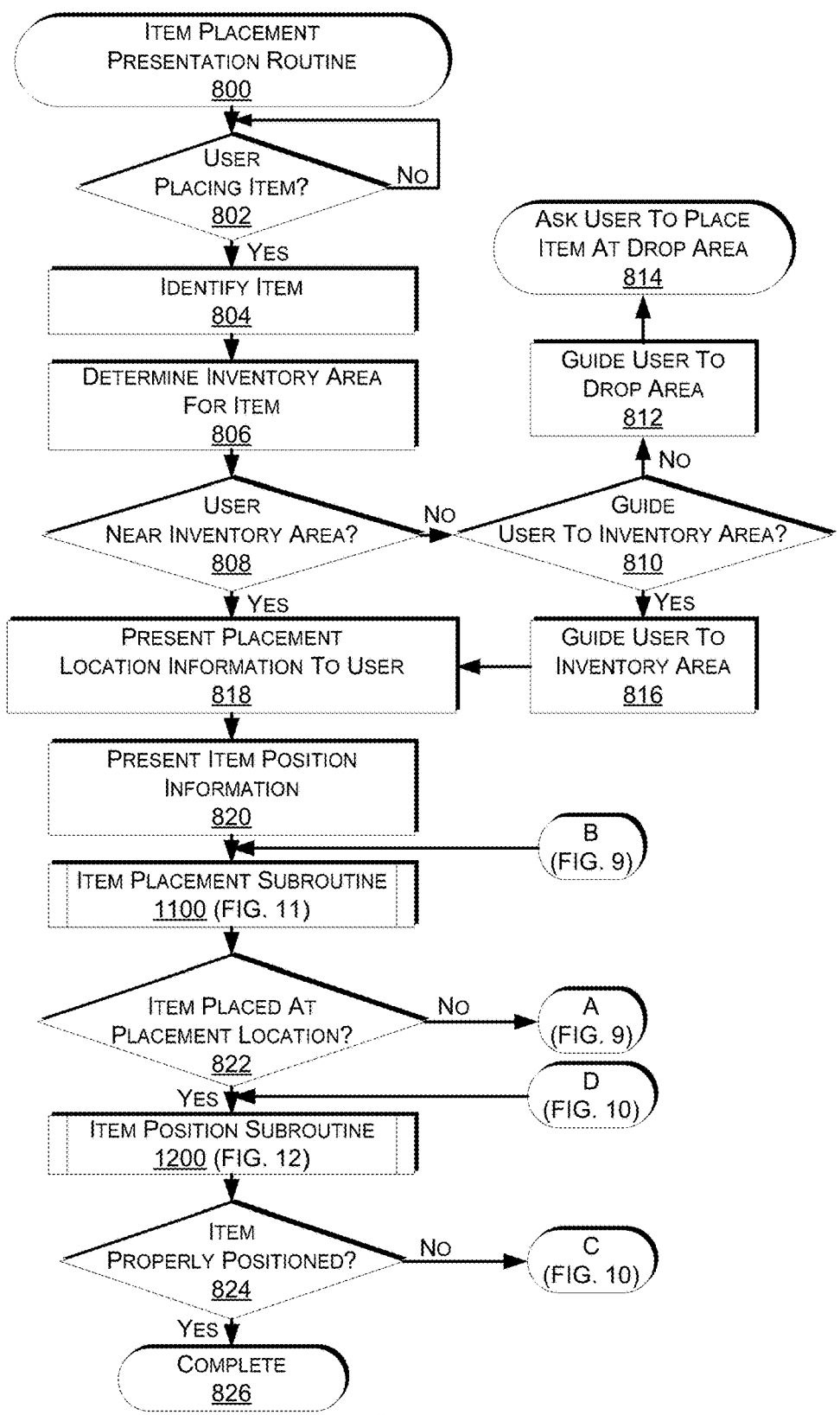
FIGS. 8-10 are a flow diagram of an example item placement presentation routine, according to one implementation.

FIG. 8 depicts a flow diagram of an example item placement presentation routine 800, according to one implementation. The example process of FIG. 8 and each of the other processes discussed herein may be implemented in hardware, software, or a combination thereof. In the context of software, the described operations represent computer-executable instructions stored on one or more computer-readable media that, when executed by one or more processors, perform the recited operations. Generally, computer-executable instructions include routines, programs, objects, components, data structures, and the like that perform particular functions or implement particular abstract data types.

The computer-readable media may include non-transitory computer-readable storage media, which may include hard drives, floppy diskettes, optical disks, CD-ROMs, DVDs, read-only memories (ROMs), random access memories (RAMs), EPROMs, EEPROMs, flash memory, magnetic or optical cards, solid-state memory devices, or other types of storage media suitable for storing electronic instructions. In addition, in some implementations the computer-readable media may include a transitory computer-readable signal (in compressed or uncompressed form). Examples of computer-readable signals, whether modulated using a carrier or not, include, but are not limited to, signals that a computer system hosting or running a computer program can be configured to access, including signals downloaded through the Internet or other networks. Finally, the order in which the operations are described is not intended to be construed as a limitation, and any number of the described operations can be combined in any order and/or in parallel to implement the process.

The example process 800 begins by determining if a user is placing an item, as in 802. Determining that a user is placing an item may be achieved by utilizing one or more input components located within the materials handling facility. For example, if the user is carrying items in a tote or other container, image capture devices may capture one or more images of the user picking an item from the tote, an indication that that user is preparing to place an item. As another example, load cells or other sensors at an inventory area may determine that the user has picked an item from a location. If the item is not placed in the user's tote after a defined period of time (e.g., 10 seconds), it may be determined that the user is preparing to place the item (they looked at it but are putting it back at the location). As still another example, the inventory area may include a light curtain, motion sensor, or other input components that can determine when a user is reaching into the inventory area. If it is determined that the user is reaching into the inventory area, it may be determined that the user is placing an item. As still another example, if the user is placing items as part of an inventory replenishment operation (e.g., they are adding new inventory), when the user scans the item or removes the item from a tote, it may be determined that the user is in the process of placing the item.

If it is determined that the user is not placing or preparing to place an item, the example process 800 returns to decision block 802 and continues. However, if it is determined that the user is placing an item or preparing to place an item, the item is identified, as in 804. The item may be identified based on the activities of the user, such as items previously picked by the user, items in the user's possession, etc. Alternatively, or in addition thereto, one or more image capture devices within the materials handling facility may capture an image of the item and the inventory management system may process that image to identify the item. For example, the inventory management system may perform image recognition, object recognition, edge detection, character recognition or other image processing to identify features of the item represented in the image. Those features are then compared with stored item features of known items. In one implementation, if it is determined that the user has removed an item from their tote and it is known what items are in the user's tote, images of the removed item may be captured, processed and compared to stored features associated with the items known to be in the user's tote. As still another example, the item may include one or more visual identifiers (barcode, QR code, bokode, etc.) and/or active identifiers (RFID tag) that are detected and used to identify the item.

Upon item identification, an inventory area associated with the item is determined, as in 806. As discussed above, items may be stored in one or more inventory areas within the materials handling facility and those areas are associated with the items and maintained by the inventory management system. When the item is identified, the associated inventory area is determined.

A determination is also made as to whether the user is currently located near the inventory area that is associated with the item, as in 808. It may be determined that a user is near the inventory area if they are within a defined distance of the inventory (e.g., five feet).

If it is determined that the user is not near the inventory area, a determination is made as to whether the user should be guided to the inventory area associated with the item that the user is preparing to place, as in 810. For example, if the inventory area is within a defined travel distance for the user, it may be determined that the user should be guided to the inventory area to place the item. A defined travel distance for the user may be based on, for example, a preference distance provided by the user, past interactions with the user, and/or any other defined distance. For example, a defined travel distance may be any defined distance from the inventory area, such as 20 feet. The defined travel distance may be different for different users, different items, different weights of items, different materials handling facilities and/or different times of day.

A user may specify how far they are willing to travel to return an item to the inventory area. In still another example, the defined travel distance may be established based on past interactions with the user. For example, if the user has previously been guided to a placement area for placing an item and they did not follow the guidance, it may be determined that the distance the user needed to travel to place the item was too far. In such an example, the defined travel distance for that user (and/or item) may be reduced.

In still another example, it may be determined whether the inventory area or a drop area is closer to the user's location. If the inventory area is closer, it will be determined that the user is near the inventory location and should be guided to the inventory location. If the drop area is closer to the user's location, it will be determined that the user should be guided to the drop area. As another example, if the user is replacing an item that was previously improperly placed by another user (e.g., to receive awards or other incentives), it may be determined that the user should be guided to the inventory area associated with the item.

If it is determined that the user should not be guided to the inventory area associated with the item to be placed, the user is guided to a drop area, as in 812. For example, guidance information may be provided to a portable device of the user and presented to the user. Alternatively, or in addition thereto, guidance information may be provided to an output device of the materials handling facility that is near the user and presented to the user. A drop area may be a defined location within the materials handling facility where items may be placed that will later be returned to their associated inventory area. For example, another user may periodically retrieve items placed at a drop area and return those items to their associated inventory areas.

Upon guiding the user to the drop area, information is provided to the user asking the user to place the item at the drop area, as in 814.

If it is determined that the user should be guided to the inventory area associated with the item that the user is preparing to place, instructions are provided to the user that guide the user to the inventory area, as in 816. For example, guidance information may be provided to a portable device of the user and presented to the user. Alternatively, or in addition thereto, guidance information may be provided to an output device of the materials handling facility that is near the user and presented to the user, thereby providing guidance to the inventory area associated with the item.

After guiding a user to the inventory area, or if it is determined at decision block 808 that the user is already near the inventory area, placement location information is presented to the user, as in 818. Placement location information may include any action to distinguish a placement location at the inventory area at which the item is to be placed. For example, the placement location information may include altering the information presented on a display or other output device at the placement location, adjusting the brightness of a display at the placement location, reducing the brightness of other displays adjacent to the placement location, illuminating the placement location, increasing a brightness of an illumination element at the placement location, projecting a representation of the item at the placement location, emitting audio from the location, and/or decreasing the brightness of illumination elements adjacent to the placement location.

In addition to distinguishing the placement location, item position information is presented to the user, identifying a proper item position when the item is placed at the placement location, as in 820. For example, item position information may be presented on the display at the placement location, presented on a portable device and/or presented via another output device accessible by the user.

The example routine 800 continues by performing the item placement subroutine 1100 to determine if the item has been placed at the placement location. The item placement subroutine is discussed in further detail below with respect to FIG. 11. In some implementations, if it is determined that the user has placed the item at the proper location, the example process 800 may associate and/or present an award (audibly and/or visually) to the user upon proper placement of the item at the placement location. In some examples, even if the user does not place the item at the proper placement location, an award may be associated with and/or presented to the user if the user moved the item closer to the placement location.

Based on the results from the item placement subroutine 1100, a determination is made as to whether the item has been placed at the placement location, as in 822. If it is determined that the item was placed at the placement location, the item position subroutine 1200 is performed to determine if the item has been properly positioned at the placement location. The item position subroutine 1200 is discussed in further detail below with respect to FIG. 12.

Based on the results of the item position subroutine 1200, a determination is made as to whether the item was properly positioned at the placement location. If it is determined that the item was properly positioned at the placement location, as in 824, the example process 800 completes, as in 826. In some implementations, the example process 800 may also associate and/or present an award to the user upon successfully positioning an item at the proper placement location. The award may be presented to the user graphically, as illustrated in FIG. 8, and/or an audible confirmation may be presented to the user identifying that an award has been associated with the user. In some implementations, even if the user does not correctly position the item, the example process 800 may associate and/or present a award to the user representative of how close they were to properly positioning the item.

Figure 9:
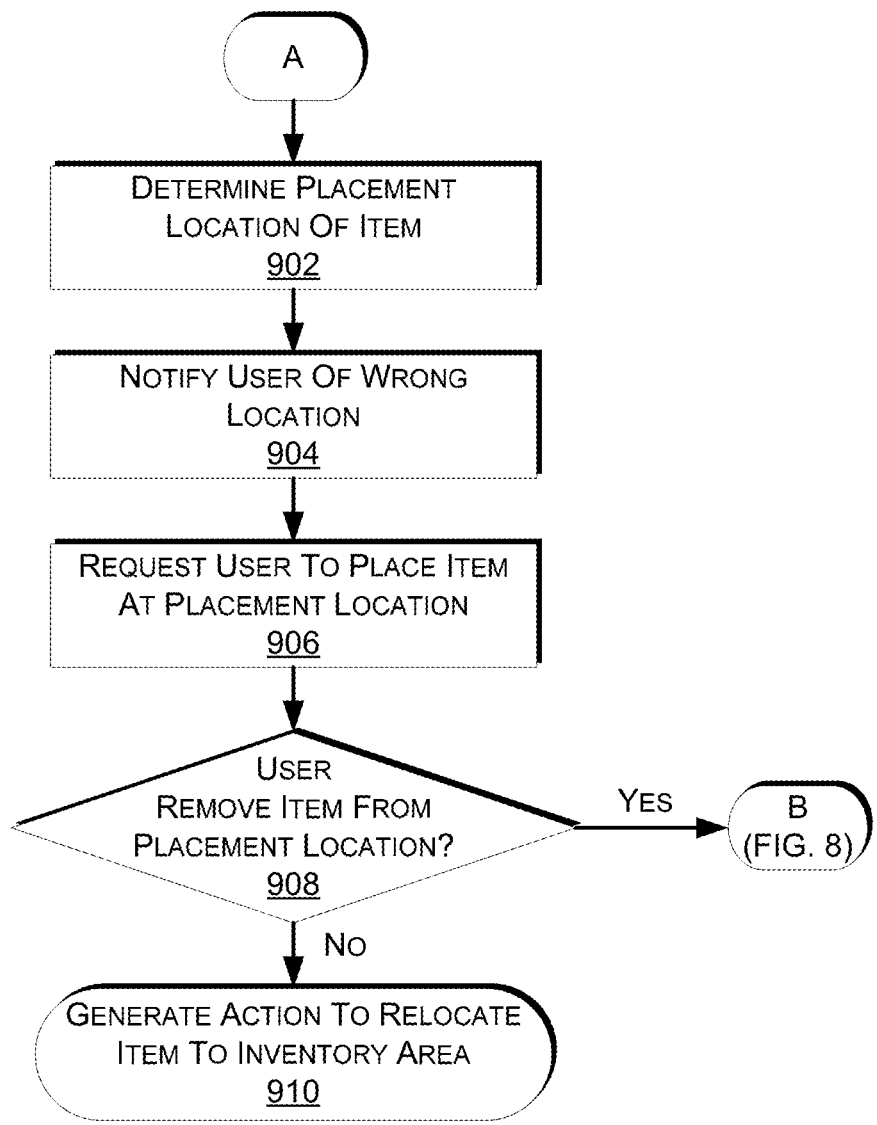

Returning to decision block 822, if it is determined that the item was not placed at the placement location (i.e., it was placed at some other location within the materials handling facility), the example process continues and determines the placement location of the item, as in 902 (FIG. 9). In addition, the user may be notified that the item has been placed at the wrong location within the materials handling facility, as in 904. For example, placement notification information may be provided by the inventory management system to an output device that presents the information to the user notifying the user that they have placed the item at the wrong location. The notification information may also include a request that the user place the item at the placement location, as in 906. For example, the information provided to the user may request that the user remove the item from the improper location and place the item at the proper placement location and/or a drop area.

A determination is also made as to whether the user has removed the item from the location where it was improperly placed, as in 908. If it is determined that the user has removed the item from the location at which it was improperly placed, the example process 800 returns to block 1100 (FIG. 8) and continues. However, if the item is not removed, an action may be generated to relocate the item to the proper inventory area associated with the item, as in 910. It may be determined that the user has not removed the item upon expiration of a defined period of time. For example, after the user is notified of the improper placement, the example process may wait for 30 seconds (or any other defined period of time) and/or wait until the user has moved a distance away from the inventory area before determining that the user has not removed the item from the improper location. The action to relocate the item may be assigned to a user, agent and/or employee of the materials handling facility to retrieve the item from the improper location and place it at the inventory area associated with the item. For example, a user may be presented with instructions to retrieve the item from the location along with guidance information to guide the user to an inventory area associated with the item, as discussed in more detail below. When the user arrives at the inventory area associated with the item and begins to place the item, the example process 800 may start and complete to confirm that the user is placing the item at the proper placement location at the proper position.

Returning to decision block 824 (FIG. 8), if it is determined that the user did not properly position the placed item, the example process continues and provides a notification to the user identifying that the item has been incorrectly positioned, as in 1002. A notification may also be presented to the user requesting that the user reposition the item, as in 1004. For example, based on the results of the item position subroutine 1200, an animation and/or other instructions may be presented to the user to assist the user in repositioning the item.

A determination may then be made as to whether the user has repositioned the item, as in 1006. If it is determined that the user has repositioned the item, the example process returns to block 1200 which executes again to determine if the repositioned item is now properly positioned. This process may continue and additional guidance provided to the user until it is determined that the item has been properly positioned at the placement location.

However, if it is determined that the user has not repositioned the item, an action is generated to reposition the item, as in 1008. It may be determined that the user has not repositioned the item upon expiration of a defined period of time. For example, after the user is notified that the item needs to be repositioned, the example process may wait for 30 seconds (or any other defined period of time) and/or wait until the user has moved a distance away from the item before determining that the user has not repositioned the item. The action to reposition the item may be assigned to a user to reposition the item so that it is in its proper position.

For example, a user that is near the item may be presented with instructions to reposition the item. As the user repositions the item, the example process may continue from block 820 to confirm that the item is properly repositioned.

Figure 11:
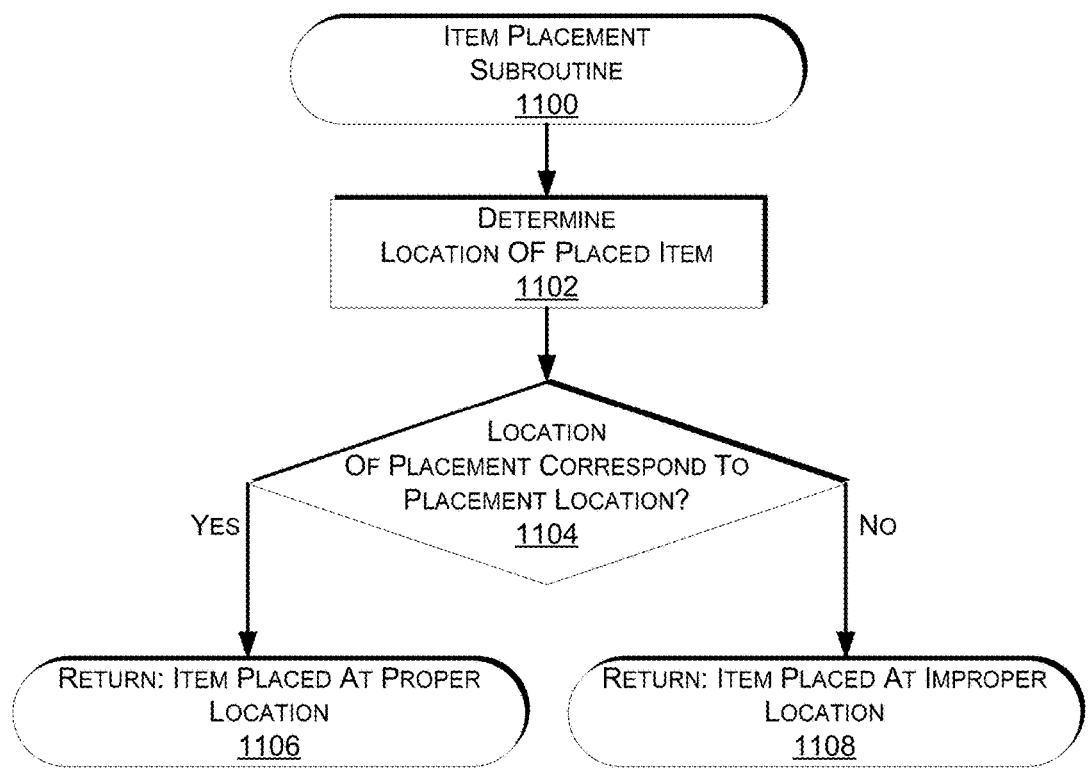
FIG. 11 is a flow diagram of an example item placement subroutine, according to one implementation.

FIG. 11 is a flow diagram of an example item placement subroutine 1100, according to one implementation. The item placement subroutine 1100 begins by determining the location of a placed item, as in 1102. Determination of the location of a placed item may be done through use of one or more input devices within the materials handling facility. For example, when a user places an item at an inventory location that includes a scale, load cell, pressure sensor, etc., the inventory location will register an increase in weight as a result of the item placement. This information may be used to determine the location of the item. Additional information, such as the user's location and/or images captured of the item being placed at a location may also be used to determine a location of the item. In still other examples, the item may include visual identifiers and/or active identifiers that are detected when the item is placed and used to determine the location of the placed item.

Based on the determined location of the placed item, a determination is made as to whether the location of the placed item corresponds to the placement location where the item was supposed to be placed, as in 1104. If it is determined that the determined location of the placed item corresponds with the placement location, the example subprocess 1100 returns a notification that the item was placed at the proper location, as in 1106. However, if it is determined that the location of the item does not correspond with the placement location, the example subprocess 1100 returns a notification that the item was placed at an improper location, as in 1108.

Figure 12:
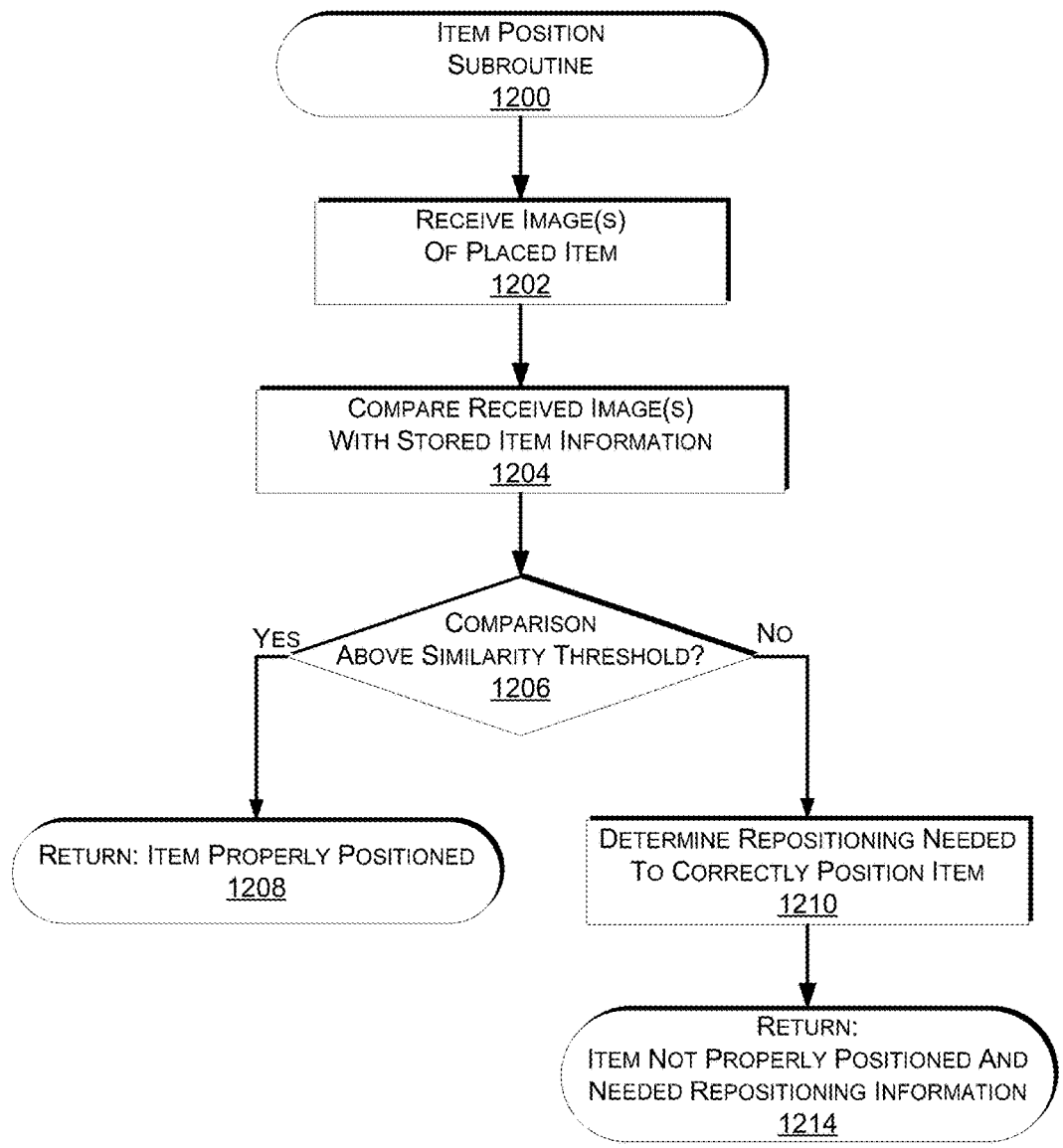
FIG. 12 is a flow diagram of an example item position subroutine, according to one implementation.

FIG. 12 is a flow diagram of an example item position subroutine 1200, according to one implementation. The item position subroutine 1200 begins by receiving an image of a placed item, as in 1202. The received image is processed and compared with stored images and/or features of the item representative of the proper placement of the item. Stored images and/or features of the item may be obtained for images when the items are properly positioned (e.g., label facing forward) at a location. Those images may be associated with the item and maintained in an item data store by the inventory management system. When an image of a placed item is received by the inventory management system, it may be processed using one or more of edge detection, object recognition, feature detection, pixel analysis, or image recognition.

In some implementations, stored images and/or features of the item may maintained for various orientations and/or positions of the item when placed. For example, one or more stored images and/or features may be maintained for the proper position of the item, a second set of one or more stored images and/or features may be maintained when the item is out of position by a defined amount (e.g., out of position between 1-5 degrees in one direction). In this implementation, multiple sets of images and/or features of the item at different positions and/or orientations may be obtained, stored and used when comparing a captured image with stored information.

The processed image is compared with stored item information to determine a similarity score between the received image and the stored image(s) of the item when the item is properly positioned. In some implementations, the stored item information may include multiple positions that are considered proper positions for the item. In other implementations, there may only be one proper position for the item.

In still other implementations, the position of the item may be considered with respect to other items. For example, if the item is an apple that has been placed on a pile of apples, the specific orientation of the apple may not be important but the position of the apple with respect to the pile of apples may be important. For example, the proper position of an apple placed on a pile may be such that it needs to be resting on at least three other apples or on a flat surface, not on the edge of the pile. In implementations where stored images of the item at different positions are maintained, the processed image is compared to each of the stored images representative of the different item positions and a similarity score for each respective position is obtained.

A determination is then made as to whether the similarity score exceeds a similarity threshold and/or a determination is made as to which stored image representative of a position has the highest similarity score, as in 1206. The similarity threshold may be any defined threshold for determining if the item has been properly positioned at the placement location. The similarity threshold allows for variations in the position, lighting variations, etc. The threshold may be different for different users, different items, different times of day, etc. For example, some items may have a lower threshold because they are easily recognizable regardless of position. Other items may have a higher threshold because they are not easily recognizable (e.g., they need to be oriented so that their label is facing forward to enable identification).

If it is determined that the similarity score exceeds the similarity threshold and/or if the highest similarity score corresponds with the stored image associated with the proper item position, the example subprocess 1200 returns a notification that the item is properly positioned. However, if it is determined that the similarity score does not exceed the threshold and/or if it is determined that the highest similarity score corresponds with stored images of the item when it is not properly positioned, the repositioning needed to correct the position of the item is determined, as in 1210.

Determining repositioning can be done by comparision of the image of the item placed with the stored item information. For example, using edge detection and/or object detection, features of the item can be identified and compared with similar features of the stored item information. Based on that comparison, a determination can be made as to which direction the item needs to be rotated or otherwise turned to correctly position the item. In implementations that maintain images representative of different item positions and a similarity score is determined for each item position, it can be determined, based on the position associated with the stored images, which direction and by how much the item needs to be moved from the current position to be considered properly positioned. For example, if the processing determines that the image of the item as currently positioned has a highest similarity score with a stored image representative of the item when it is 10-15 degrees out of position to the left, it can be determined that the item needs to be rotated 10-15 degrees to the right before it can be considered properly positioned.

Based on the determined repositioning that needs to be done to properly position the item, the example subprocess 1200 returns a notification that the item is not properly positioned, and provides the needed repositioning information, as in 1214. The needed repositioning may be presented visually (e.g., animation and/or video), audibly and/or through haptic feedback (e.g., the portable device may vibrate until the item is properly positioned.

Figure 13:
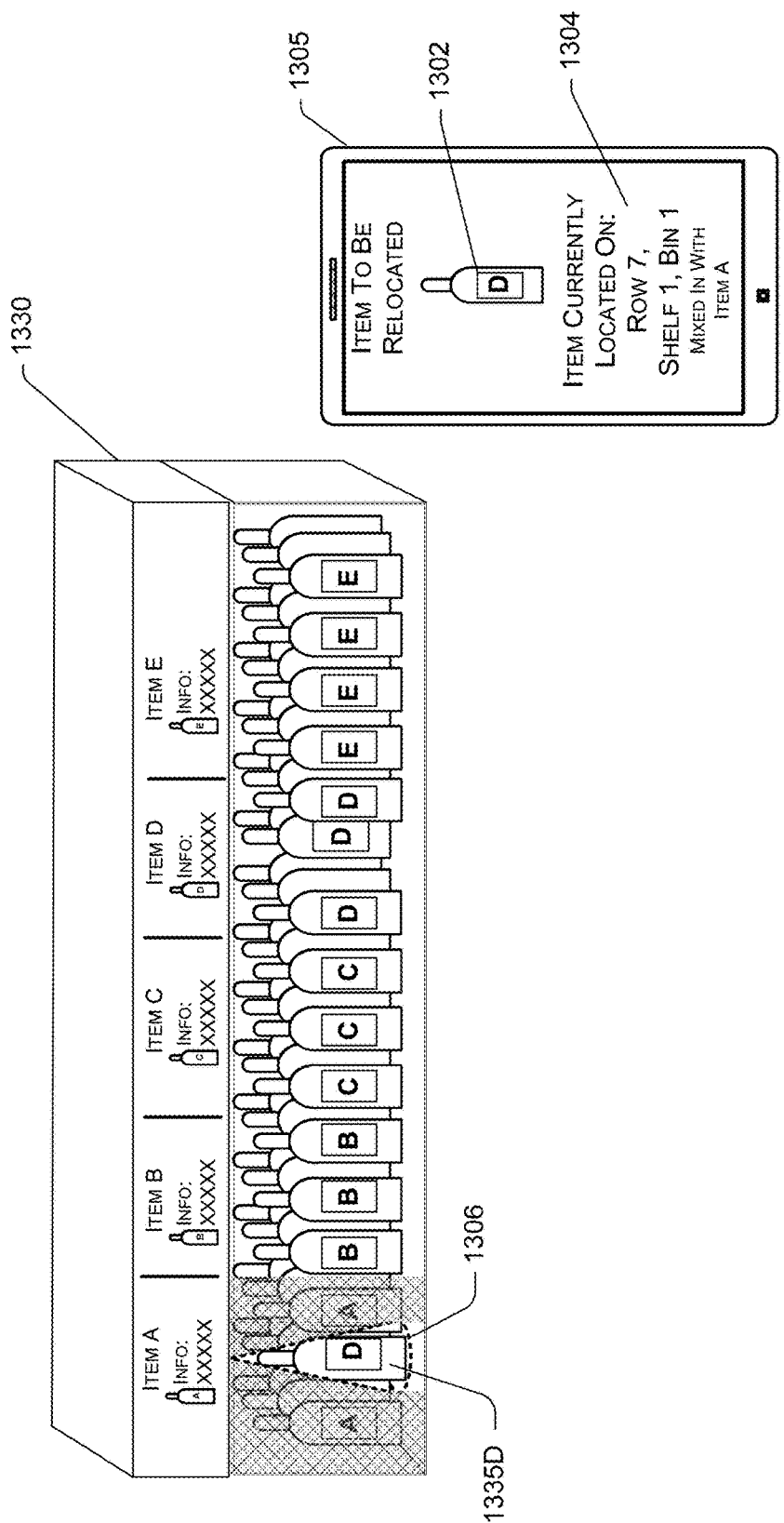
FIGS. 13-15 are block diagrams of an inventory area and a display for presenting item information, according to one implementation.
Figure 14:
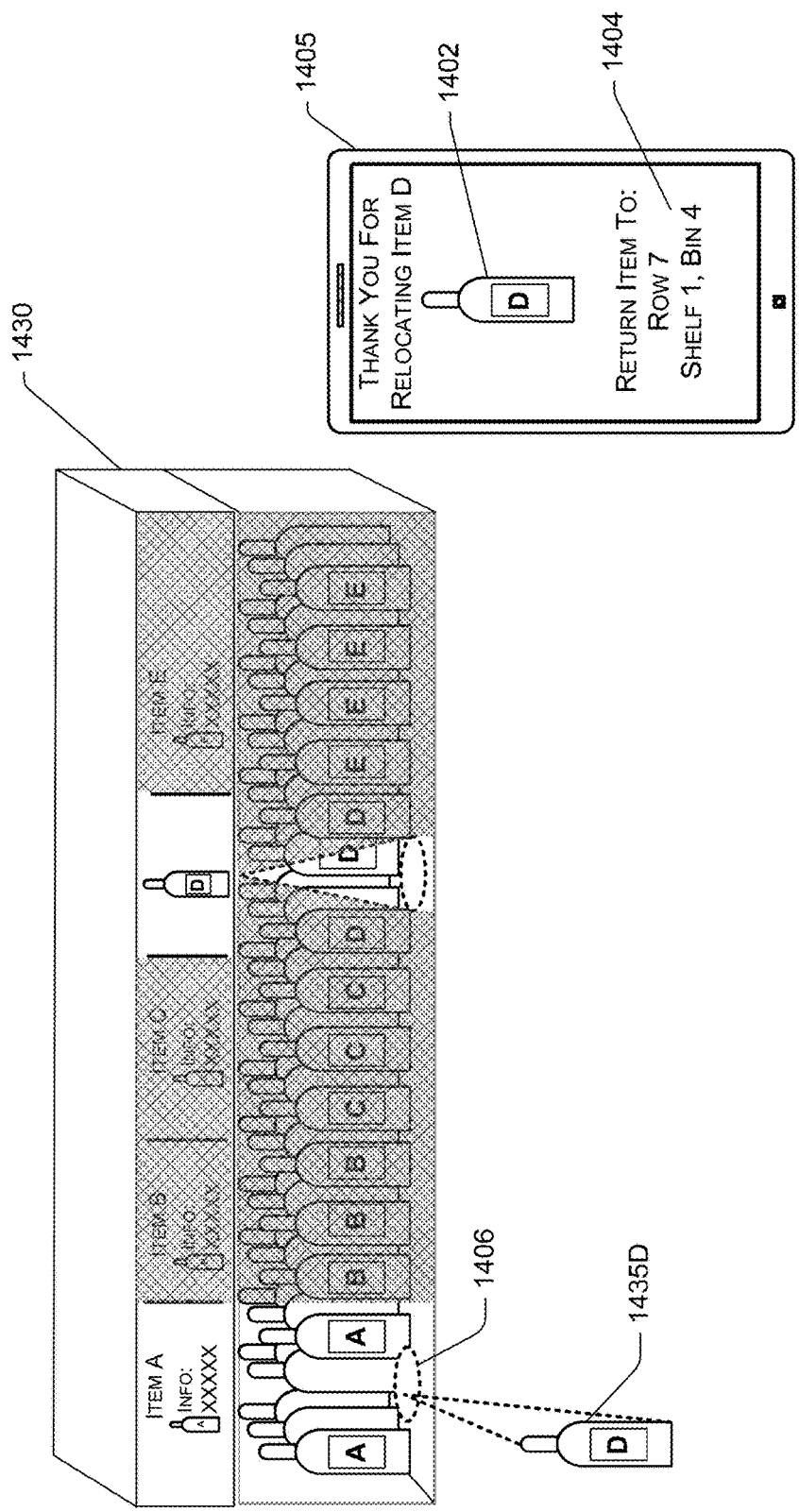
Figure 15:
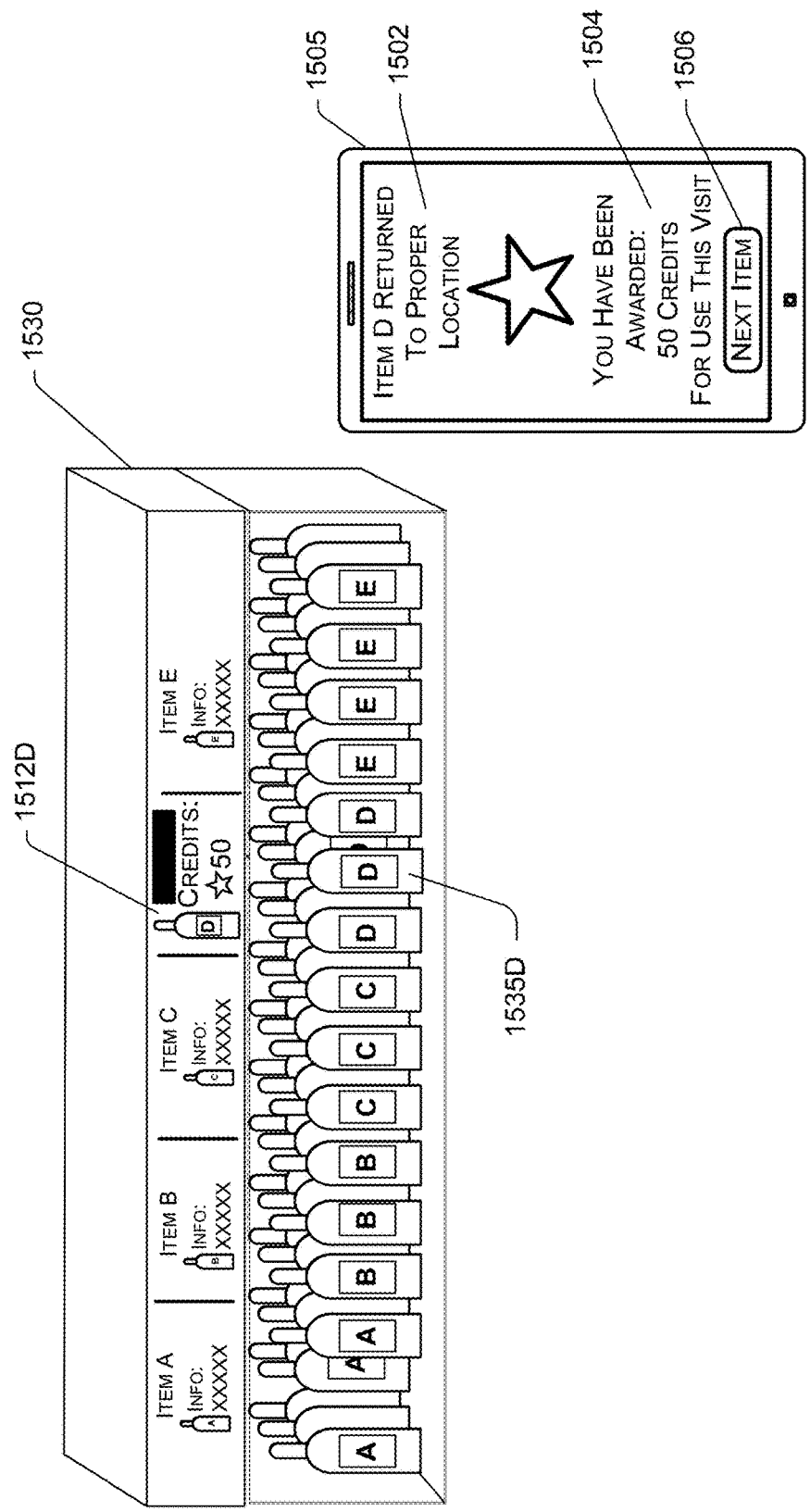

FIGS. 13-15 are block diagrams of an inventory area and a display for presenting item information, according to one implementation. As discussed above, in some implementations, users may select to relocate misplaced items and/or reposition items that are not properly positioned. In some implementations, user's may establish preferences as to the types of items they are interested in relocating, the distance they are willing to travel to relocate items, the weight of items they are willing to relocate, whether they are willing to relocate items misplaced by others, and the like.

In one implementation, a user may be provided with information as to where an improperly placed item is currently located. For example, the inventory management system 150 may provide item location information to a portable device 1305 that is presented to a user. The location information may identify the location of an item that is not located in the inventory area with which it is associated. In this example, the user is provided information identifying the current location 1306 of "Item D" 1335D. The location information may include, for example, a representation 1302 of the item, location details 1304 identifying the current location 1306 of the item that is to be relocated, etc. For example, the current location 1306 can be identified as Row 7, Shelf 1, Bin 1, which is the inventory area associated with Item A items. In some implementations, the location information may include an image of the item, an image of the item at its current location, and/or a live video feed that includes the current location of the item. The location information may also identify an amount of the award that the user will receive if they properly relocate the item.

As the user approaches the inventory area where the item to be relocated is currently located, the item location 1306 may be distinguished to assist the user in identifying the item 1335D to be relocated. For example, the illumination elements within the inventory area 1330 may adjust to distinguish the location 1306 of the item 1335D to be relocated. For example, the brightness of the illumination element at the current location 1306 of the item 1335D may be increased and/or the brightness of the illumination elements adjacent to the current location 1306 of the item 1335D may be decreased, as illustrated in FIG. 13. Likewise, if a video of the current location of the item is presented to the user, the user may watch the video and compare it to the location as they approach to confirm that they are approaching the location of the item.

Referring to FIG. 14, when the user removes the item from the current location 1406, the user may be presented with a confirmation that they removed or picked the right item along with guidance information identifying where the item is to be taken for relocation. For example, the user may receive a confirmation 1402 on the display of the portable device 1405 that they have picked the right item and directions or location details 1404 (e.g., row, shelf, bin) information as to where the item is to be relocated. In this example, the confirmation includes a notification that the user picked item D along with a graphical representation of the picked item. In this example, the direction or location details 1404 notify the user that the item is to be relocated to Row 7, Shelf 1, Bin 4, the inventory area associated with Item D items.

When the user arrives at the inventory area at which the item is to be relocated, similar to the discussion above with respect to placing an item (FIGS. 6-8), the user may receive assistance in identifying the placement location for the item and the proper position of the item. For example, FIG. 15 shows a block diagram of the inventory location 1530 after the user has relocated the item 1535D and properly positioned the item 1535 at the placement location. As shown, the output device 1512D provides a confirmation to the user that the user has properly relocated the item and properly positioned it at the placement location. Likewise, the display in this example identifies to the user the award associated with the user's account in response to completing the relocation of the item. In this example, the user has received 50 credits that may be used toward a purchase of another item. In some implementations, an audible confirmation of the award may be presented to the user. In comparison to the discussion above with respect to FIGS. 5-7 where the user was replacing an item that the user picked, in this example the user may receive a larger reward because they are relocating an item that had been improperly placed within the materials handling facility.

In addition to the confirmation provided via the display 1512D, confirmation and/or award information may also be provided to the portable device 1505 and presented to the user using a display and/or speaker of the portable device 1505. In this example, the confirmation is presented as a statement: "Item D Returned to Proper Location" 1502. The award information 1504 identifies that the user has received 50 credits for use this visit to the materials handling facility for relocating the item. As discussed above, any type of award or incentive may be provided to a user to encourage a user to relocate and/or properly position items within the materials handling facility.

In some implementations, the user may select the "Next Item" control 1506 to receive guidance to another item that needs to be relocated and/or repositioned.

Figure 10:
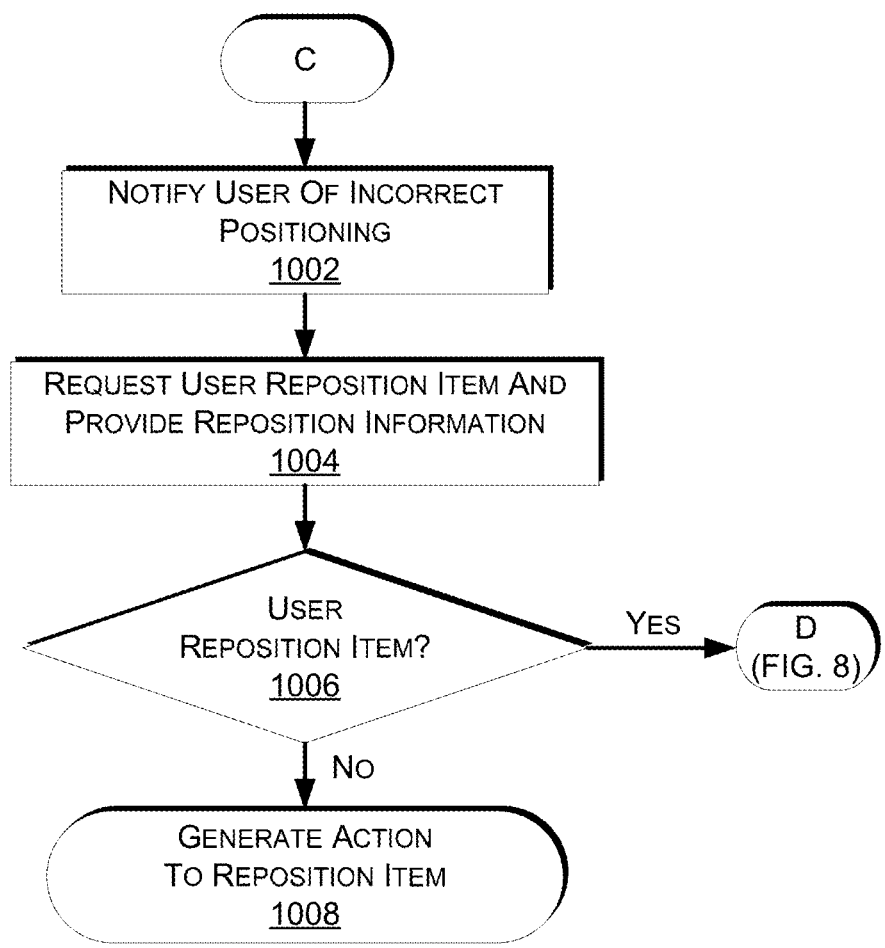
Figure 16:
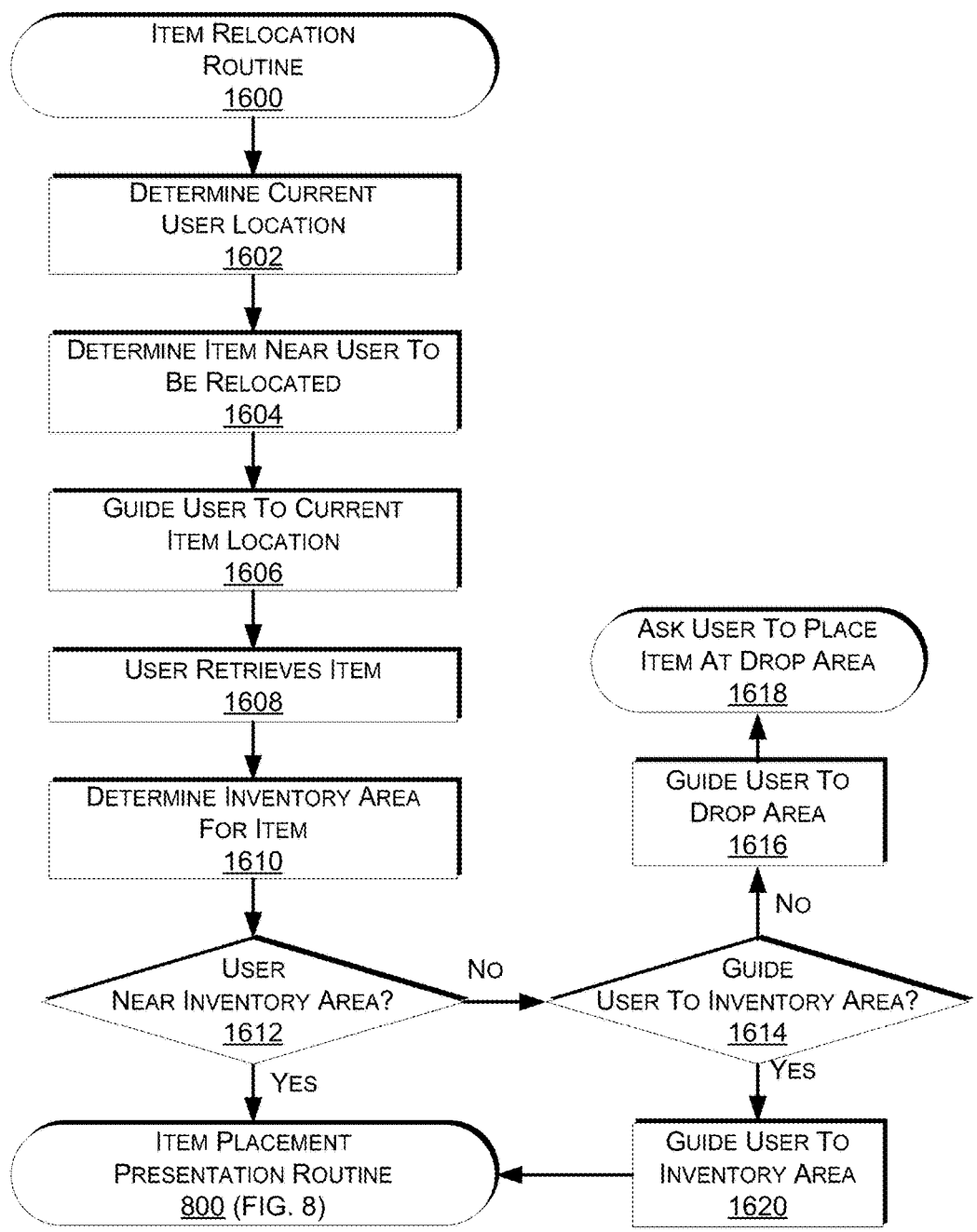
FIG. 16 is a flow diagram of an example item relocation routine, according to one implementation.

FIG. 16 is a flow diagram of an example item relocation routine 1600, according to one implementation. The example routine 1600 begins by determining a current location of a user, as in 1602. A current location of a user may be determined, for example, based on position information of the user and/or the portable device, image analysis of images captured that include a representation of the user, etc. Based on the current location of the user, items near the user's current location that need to be relocated and/or repositioned are determined, as in 1604. As discussed above with respect to FIGS. 9 and 10, when an item is improperly placed and/or improperly positioned, an action is generated to relocate and/or reposition the item. Those actions may include the current location of the item that is improperly placed and/or improperly positioned. Utilizing the current location of the user and the location of improperly placed and/or improperly positioned items, an item near the user can be determined and guidance information generated that will guide the user to the current location of the improperly placed and/or improperly positioned item, as in 1606.

After the user navigates to the current location of the item, the user retrieves the item, from the current location, as in 1608. Alternatively, if the item is just to be repositioned, the example process 1600 may provide instructions for properly positioning the item. Once properly positioned, the example process may complete.

Upon picking of the item from the current location, the inventory area associated with the item is determined, as in 1610. For example, the inventory management system 150 may maintain inventory area and item associations that may be used to determine the inventory area at which the item is to be placed.

Based on the location of the inventory area where the item is to be placed and the location of the user, a determination is made as to whether the user is near the inventory area associated with the item, as in 1612. If it is determined that the user is near the inventory area, the item placement presentation routine 800 (FIG. 8) is performed, as discussed above, and the item is placed by the user at the placement location for the item.

However, if it is determined that the user is not near the inventory area associated with the item, a determination is made as to whether the user is to be guided to the inventory area associated with the item, as in 1614. In some implementations, the user may always be guided to the inventory area where the item is to be placed. In other implementations, a threshold distance may be established and if the distance between the user and the inventory area exceeds the threshold distance, it may be determined that the user is not to be guided to the inventory area where the item is to be placed.

If it is determined that the user is not to be guided to the inventory area associated with the item, the user is guided to a nearby drop area, as in 1616, and the user is asked to place the item at the drop area, as in 1618. In some implementations, the user may receive an award or other incentive for retrieving the item and placing it at the drop area.

If it is determined that the user is to be guided to the inventory area associated with the item and where the item is to be placed, guidance information is provided to the user, as in 1620. After guiding the user to the inventory area where the item is to be placed, the item placement presentation routine 800 (FIG. 8) may be performed to assist the user in properly placing and properly positioning the item at the inventory area.

Figure 17:
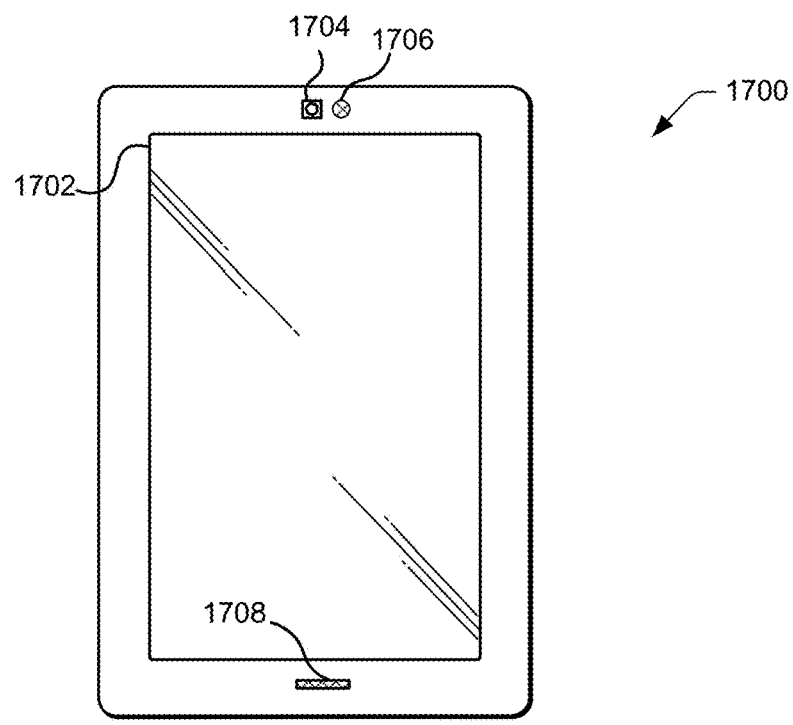
FIG. 17 illustrates an example computing device that can be used in accordance with various implementations.

FIG. 17 illustrates an example portable device 1700 that can be used in accordance with various implementations described herein. In this example, the portable device 1700 includes a display 1702 and optionally at least one input component 1704, such as a camera, on a same side of the device as the display 1702. The portable device 1700 may also include an audio transducer, such as a speaker 1706, and optionally a microphone 1708. Generally, the portable device 1700 may have any form or input/output components that allow a user to interact with the portable device 1700. For example, the various input components for enabling user interaction with the device may include a touch-based display 1702 (e.g., resistive, capacitive, Interpolating Force-Sensitive Resistance (IFSR)), camera (for gesture tracking, etc.), microphone, global positioning system (GPS), compass or any combination thereof. One or more of these input components may be included on a device or otherwise in communication with the device. Various other input components and combinations of input components can be used as well within the scope of the various implementations as should be apparent in light of the teachings and suggestions contained herein.

Figure 18:
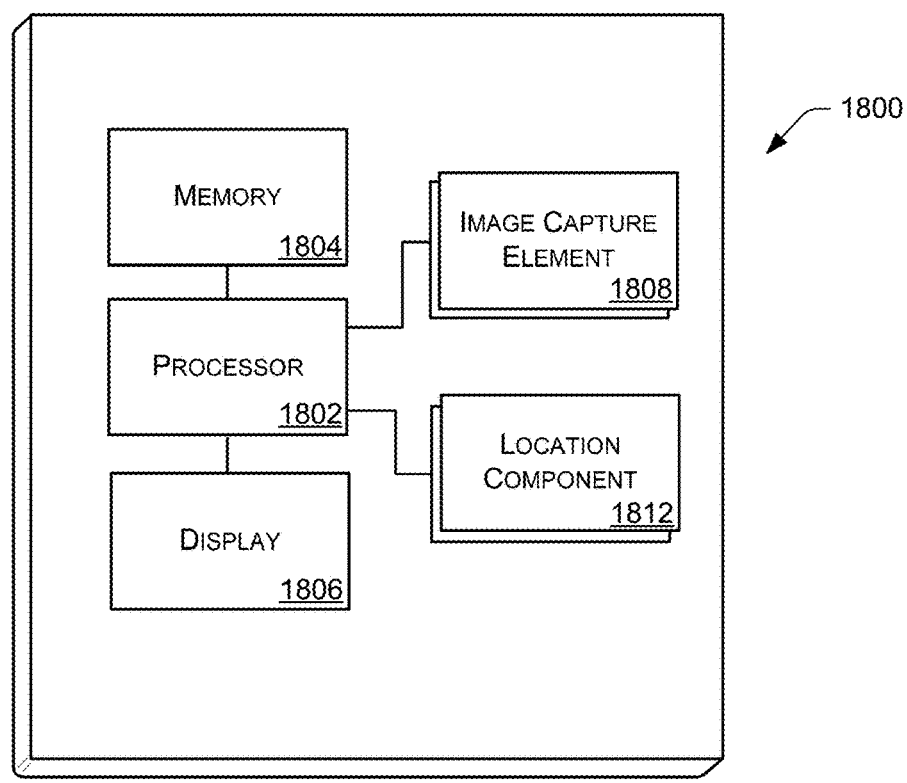
FIG. 18 illustrates an example configuration of components of a computing device, such as that illustrated in FIG. 17.

In order to provide the various functionality described herein, FIG. 18 illustrates an example set of basic components 1800 of a portable device, such as the portable device 1700 described with respect to FIG. 17 and discussed herein. In this example, the device includes at least one central processor 1802 for executing instructions that can be stored in at least one memory device or element 1804. As would be apparent to one of ordinary skill in the art, the device can include many types of memory, data storage or computer-readable storage media, such as a first data storage for program instruction for execution by the processor 1802. Removable storage memory can be available for sharing information with other devices, the inventory management system, etc. The device typically will include some type of display 1806, such as a touch-based display, electronic ink (e-ink), organic light emitting diode (OLED) or liquid crystal display (LCD).

As discussed, the device in many implementations will include at least one image capture element 1808, such as one or more cameras that are able to image objects in the vicinity of the device. An image capture element can include, or be based at least in part, upon any appropriate technology, such as a CCD or CMOS image capture element having a determined resolution, focal range, viewable area, and capture rate.

The device also can include at least one location component 1812, such as GPS, NFC location tracking, Wi-Fi location monitoring or indoor location monitoring. Location information obtained by the location component 1812 may be used with the various implementations discussed herein to identify the location of the user.

The example portable device may also include at least one additional input device able to receive conventional input from a user. This conventional input can include, for example, a push button, touch pad, touch-based display, wheel, joystick, keyboard, mouse, trackball, keypad or any other such device or element whereby a user can input a command to the device. These I/O devices could be connected by a wireless, infrared, Bluetooth, or other link as well in some implementations. In some implementations, however, such a device might not include any buttons at all and might be controlled only through touch (e.g., touch-based display), audio (e.g., spoken) commands, or a combination thereof.

Figure 19:
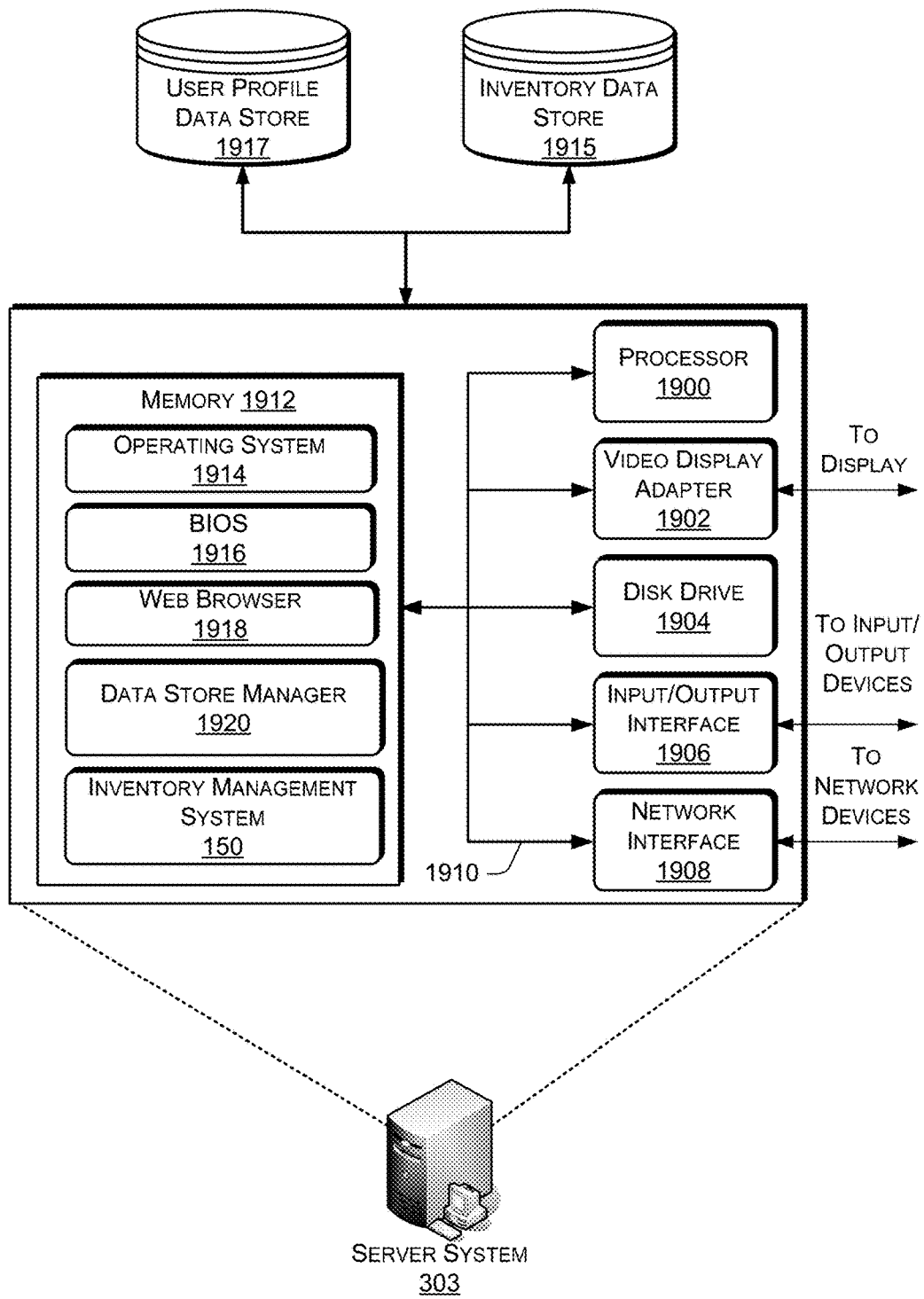
FIG. 19 is a block diagram of an illustrative implementation of a server system that may be used with various implementations.

FIG. 19 is a pictorial diagram of an illustrative implementation of a server system, such as the server system 303 that may be used in the implementations described herein. The server system 303 may include a processor 1900, such as one or more redundant processors, a video display adapter 1902, a disk drive 1904, an input/output interface 1906, a network interface 1908, and a memory 1912. The processor 1900, the video display adapter 1902, the disk drive 1904, the input/output interface 1906, the network interface 1908, and the memory 1912 may be communicatively coupled to each other by a communication bus 1910.

The video display adapter 1902 provides display signals to a local display (not shown in FIG. 19) permitting an operator of the server system 303 to monitor and configure operation of the server system 303. The input/output interface 1906 likewise communicates with external input/output devices not shown in FIG. 19, such as a mouse, keyboard, scanner, or other input and output devices that can be operated by an operator of the server system 303. The network interface 1908 includes hardware, software, or any combination thereof, to communicate with other computing devices. For example, the network interface 1908 may be configured to provide communications between the server system 303 and other computing devices via the network 202, as shown in FIG. 2 and FIG. 3.

The memory 1912 generally comprises random access memory (RAM), read-only memory (ROM), flash memory, and/or other volatile or permanent memory. The memory 1912 is shown storing an operating system 1914 for controlling the operation of the server system 303. A binary input/output system (BIOS) 1916 for controlling the low-level operation of the server system 303 is also stored in the memory 1912.

The memory 1912 additionally stores program code and data for providing network services that allow the inventory management system 150 to identify users and/or items within the materials handling facility. Accordingly, the memory 1912 may store a browser application 1918. The browser application 1918 comprises computer executable instructions, that, when executed by the processor 1900 generate or otherwise obtain configurable markup documents such as Web pages. The browser application 1918 communicates with a data store manager application 1920 to facilitate data exchange between the inventory data store 1915 and/or the user profile data store 1917.

As used herein, the term "data store" refers to any device or combination of devices capable of storing, accessing and retrieving data, which may include any combination and number of data servers, databases, data storage devices and data storage media, in any standard, distributed or clustered environment. The server system 303 can include any appropriate hardware and software for integrating with the data stores 1915, 1917 as needed to execute aspects of the inventory management system 150.

The data stores 1915, 1917 can include several separate data tables, databases or other data storage mechanisms and media for storing data relating to a particular aspect. For example, the data stores 1915, 1917 illustrated include mechanisms for maintaining inventory information (e.g., item locations, images of item when properly positioned, item features), user profile information, etc., which can be used to assist users in the proper placement and/or proper positioning of items within the materials handling facility.

It should be understood that there can be many other aspects that may be stored in the data stores 1915, 1917. The data stores 1915, 1917 are operable, through logic associated therewith, to receive instructions from the server system 303 and obtain, update or otherwise process data in response thereto.

The memory 1912 may also include the inventory management system 150, discussed above. The inventory management system 150 may be executable by the processor 1900 to implement one or more of the functions of the server system 303. In one implementation, the inventory management system 150 may represent instructions embodied in one or more software programs stored in the memory 1912. In another implementation, the inventory management system 150 can represent hardware, software instructions, or a combination thereof.

The server system 303, in one implementation, is a distributed environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 19. Thus, the depiction in FIG. 19 should be taken as being illustrative in nature and not limiting to the scope of the disclosure.

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A computing system, comprising:
   one or more processors; and
   a memory coupled to the one or more processors and storing program instructions that when executed by the one or more processors cause the one or more processors to at least:
   determine that a user is preparing to place an item at an inventory area within a materials handling facility;
   determine that the item is associated with the inventory area;
   send for presentation to the user an indication of a placement location within the inventory area at which the item is to be placed;
   send for presentation to the user item position information indicating a proper item position of the item at the placement location;
   determine that the user has placed the item at the placement location;
   determine if the user has placed the item with the proper item position; and
   in response to a determination that the item has been placed with the proper item position:
   send for presentation to the user a notification indicating that the user has placed the item at the placement location and with the proper item position; and
   associate an award with the user.

2. The computing system of claim 1, wherein the memory coupled to the one or more processors and storing program instructions that when executed by the one or more processors further cause the one or more processors to at least:
   in response to a determination that the item has not been placed with the proper item position, send for presentation to the user reposition information, wherein the reposition information includes a request that the user reposition the item at the placement location, wherein the reposition information includes a representation of the item at the proper item position.

3. The computing system of claim 1, wherein the award is at least one of a credit, a discount, a free item, a badge, a coupon, or a rank.

4. The computing system of claim 1, wherein the memory coupled to the one or more processors and storing program instructions that when executed by the one or more processors further cause the one or more processors to at least:
   determine that the user has removed the item from a tote associated with the user; and
   in response to a determination that the user has removed the item from the tote, determine that the user is preparing to place the item at the inventory area within the materials handling facility.

5. A computer-implemented method for presenting item relocation and position information to a user, comprising:
   under control of one or more computing systems configured with executable instructions, identifying an item to be placed at a location within a materials handling facility;
   sending for presentation to the user item position information indicating a proper item position of the item when placed at the location;
   receiving an image of the item placed at the location;
   determining a similarity score based at least in part on a comparison of the received image of the item with a stored image, wherein the stored image includes a representation of the item when properly positioned;
   determining, based at least in part on the similarity score, that the item has been placed at the location with a proper item position; and
   sending for presentation to the user notification that the item has been placed at the location with the proper item position.

6. The computer-implemented method of claim 5, wherein sending for presentation to the user item position information includes:
   sending for presentation to the user, visually presentable item position information, wherein the visually presentable item position information includes a representation of the item properly positioned.

7. The computer-implemented method of claim 5, further comprising:
distinguishing to a user the location at which the item is to be placed.

8. The computer-implemented method of claim 7, wherein distinguishing to the user the location includes at least one of: causing the location to be illuminated, causing an increase in an amount of illumination of the location, causing a decrease in an amount of illumination near the location, sending for presentation to the user on a display adjacent to the location a location identifier, causing a projection of a representation of the item at the location, causing an emission of audio from the location, or sending for presentation to the user location information associated with the location on a display.

9. The computer-implemented method of claim 5, wherein the comparison is based at least in part on a result of processing of the received image using one or more of edge detection, feature detection, object recognition, image recognition, shape detection, or a pixel analysis.

10. The computer-implemented method of claim 5, wherein determining that the item has been placed at the location with the proper item position, includes:
receiving an image of the item placed at the location;
determining a first similarity score based at least in part on a comparison of the received image of the item with a first stored image of the item, wherein the first stored image of the item includes a representation of the item at a first position, wherein the first position corresponds with the proper item position;
determining a second similarity score based at least in part on a comparison of the received image of the item with a second stored image of the item, wherein the second stored image of the item includes a representation of the item at a second position, wherein the second position does not correspond with the proper item position; and
determining, that the first similarity score is higher than the second similarity score.

11. The computer-implemented method of claim 5, further comprising:
associating an award with a user that placed the item at the location; and
wherein sending for presentation to the user a notification that the item has been placed at the location with the proper item position, includes sending for presentation to the user at least one of a graphical acknowledgement that the item has been placed at the location with the proper item position, an audible confirmation that the item has been placed at the location with the proper item position, a graphical representation of the award associated with the user, or an audible confirmation of the award associated with the user.

12. The computer-implemented method of claim 11, wherein an amount of the award is based at least in part on one or more of an item value, an item velocity, a distance traveled by the user to place the item at the location, a user profile, or a quantity of the item, a shape of the item, a weight of the item, an item type, an item location, a time taken by the user to relocate the item, and/or based on how long the item has been at a wrong location.

13. The computer-implemented method of claim 5, further comprising:
sending instructions for guiding a user from a current user location to a current item location.

14. The computer-implemented method of claim 5, further comprising:
determining that a user has picked the item from a current item location.

15. A method comprising:
under control of one or more computing devices configured with executable instructions,
determining a current user location of a user within a materials handling facility;
determining a current item location of an item to be relocated;
sending first instructions for guiding the user from the current user location to the current item location; and
sending second instructions for guiding the user from the current item location to an item placement location;
determining that the item has been placed at the item placement location with a proper item position;
associating an award with the user for relocating the item; and
providing a notification that the item has been placed at the item placement location with the proper item position.

16. The method of claim 15, further comprising:
sending third instructions for guiding the user from the item placement location to a second current item location associated with a second item to be relocated.

17. The method of claim 15, wherein the item placement location is at least one of an inventory area associated with the item or a drop area for placing items, wherein the proper item position is any item position at the drop area.

18. The method of claim 15, wherein the award is at least one of a credit, a discount, a free item, a badge, a coupon or a rank.

19. The method of claim 15, further comprising:
sending third instructions that cause the current item location to be distinguished from where the item is to be picked.

20. The method of claim 19, wherein sending instructions includes at least one of: sending instructions that cause an illumination of the current item location, sending instructions that cause an increase in an illumination of the current item location, sending instructions that cause a decrease in an illumination near the current item location, sending instructions that cause a presentation of a location identifier on a display adjacent to the current item location, or sending instructions that cause a presentation of location information associated with the current item location on a display.

21. The method of claim 15, wherein the user is provided an incentive to relocate the item.

* * * * *